(12) United States Patent
Spahn et al.

(10) Patent No.: US 11,134,066 B2
(45) Date of Patent: Sep. 28, 2021

(54) METHODS AND DEVICES FOR PROVIDING CYBER SECURITY FOR TIME AWARE END-TO-END PACKET FLOW NETWORKS

(71) Applicant: ABB Power Grids Switzerland AG, Baden (CH)

(72) Inventors: Wolfgang Spahn, Bern (CH); Jon Duri Sarott, Thörishaus (CH)

(73) Assignee: ABB Power Grids Switzerland AG, Baden (CH)

( * ) Notice: Subject to any disclaimer, the term of this patent is extended or adjusted under 35 U.S.C. 154(b) by 221 days.

(21) Appl. No.: 16/564,353

(22) Filed: Sep. 9, 2019

(65) Prior Publication Data

US 2020/0007517 A1    Jan. 2, 2020

Related U.S. Application Data

(63) Continuation of application No. PCT/EP2018/055628, filed on Mar. 7, 2018.

(Continued)

(51) Int. Cl.
*H04L 29/06* (2006.01)
*H04L 12/815* (2013.01)
(Continued)

(52) U.S. Cl.
CPC .......... *H04L 63/0485* (2013.01); *H04L 43/10* (2013.01); *H04L 45/22* (2013.01);
(Continued)

(58) Field of Classification Search
None
See application file for complete search history.

(56) References Cited

U.S. PATENT DOCUMENTS

2003/0061505 A1*  3/2003  Sperry .................... H04L 69/16
                                                  726/14
2003/0110302 A1*  6/2003  Hodges ................... H04L 67/28
                                                  709/249

(Continued)

FOREIGN PATENT DOCUMENTS

CN          1901509 A      1/2007
CN        101567818 A     10/2009
(Continued)

OTHER PUBLICATIONS

European Patent Office, International Search Report & Written Opinion issued in corresponding Application No. PCT/EP2018/055628, dated May 17, 2018, 12 pp.

(Continued)

*Primary Examiner* — William J. Goodchild
(74) *Attorney, Agent, or Firm* — Slater Matsil, LLP

(57) ABSTRACT

To provide secure communication over end-to-end data paths or segments of end-to-end paths in a timed deterministic packet network including a plurality of packet engines that perform packet handling, cipher engines are provided separately from the packet engines. The cipher engines are operative to perform at least one cyber security function. A cipher engine and key manager provides central control for the plurality of cipher engines. A centralized packet flow path manager, PFPM, may set up endpoint nodes and intermediate transit nodes of the end-to-end data paths of the packet network.

28 Claims, 10 Drawing Sheets

Related U.S. Application Data

(60) Provisional application No. 62/610,164, filed on Dec. 23, 2017, provisional application No. 62/468,845, filed on Mar. 8, 2017, provisional application No. 62/468,808, filed on Mar. 8, 2017.

(51) Int. Cl.

| | | |
|---|---|---|
| *H04L 12/805* | (2013.01) | |
| *H04L 12/935* | (2013.01) | |
| *H04L 12/26* | (2006.01) | |
| *H04L 12/707* | (2013.01) | |
| *H04L 12/721* | (2013.01) | |
| *H04L 12/723* | (2013.01) | |

(52) U.S. Cl.
CPC .............. *H04L 45/38* (2013.01); *H04L 47/22* (2013.01); *H04L 47/365* (2013.01); *H04L 49/3018* (2013.01); *H04L 63/0457* (2013.01); *H04L 63/0471* (2013.01); *H04L 63/08* (2013.01); *H04L 45/50* (2013.01)

(56) References Cited

U.S. PATENT DOCUMENTS

| | | | | |
|---|---|---|---|---|
| 2006/0126827 | A1* | 6/2006 | Milleville | H04L 9/3236 380/28 |
| 2006/0285493 | A1* | 12/2006 | Manuja | H04L 65/1006 370/235 |
| 2008/0109889 | A1 | 5/2008 | Bartels | |
| 2008/0130894 | A1* | 6/2008 | Qj | H04L 63/0485 380/277 |
| 2010/0284404 | A1 | 11/2010 | Gopinath et al. | |
| 2010/0313015 | A1 | 12/2010 | Hartmann et al. | |
| 2012/0237024 | A1* | 9/2012 | Liu | H04L 9/0877 380/44 |
| 2014/0064481 | A1 | 3/2014 | Abraham et al. | |
| 2014/0208094 | A1 | 7/2014 | Rajsic et al. | |
| 2014/0233568 | A1 | 8/2014 | Dong | |
| 2016/0180114 | A1* | 6/2016 | Sastry | G06F 21/85 713/189 |

FOREIGN PATENT DOCUMENTS

| | | |
|---|---|---|
| CN | 101843040 A | 9/2010 |
| CN | 102549984 A | 7/2012 |
| CN | 104205753 A | 12/2014 |
| CN | 104584602 A | 4/2015 |
| JP | 2004312517 A | 11/2004 |
| JP | 2012506170 A | 3/2012 |
| WO | 2010045672 A1 | 4/2010 |

OTHER PUBLICATIONS

European Patent Office, International Preliminary Report on Patentability issued in corresponding Application No. PCT/EP2018/055628, dated May 8, 2019, 24 pp.

"Cryptograhic Protection of SCADA Communications—Draft 1," American Gas Association, AGA Report No. 12-1, Mar. 24, 2003, 42 pp.

"Cryptograhic Protection of SCADA Communications—Draft 1," American Gas Association, AGA Report No. 12, Version 1, May 28, 2003, 38 pp.

Andersson et al., "Framwork for Layer 2 Virtual Private Networks (L2VPNs)," Internet Engineering Task Force (IETF) Standard, Cisco Systems, Inc., Sep. 2006, 22 pp.

\* cited by examiner

METHODS AND DEVICES FOR PROVIDING CYBER SECURITY FOR TIME AWARE END-TO-END PACKET FLOW NETWORKS

FIELD OF THE INVENTION

The invention relates to data transmission in packet networks. The invention relates in particular to methods and devices for end-to-end and/or segment encryption and/or authentication of data traffic in protected, time aware packet flow networks.

BACKGROUND OF THE INVENTION

In networks of mission critical systems, such as monitoring high voltage lines or networks of other industrial automation control systems (IACS), many applications still rely on legacy connection oriented technology. For the higher layers of application design, the relationship between sender and receiver can be considered like a direct wired data link. When looking into applications like steering high speed trains, controlling air traffic or automation of high voltage lines, the direct deterministic relation between actor and re-actor simplifies higher layers of system design substantially and contributes to today's high overall systems reliability.

For various reasons, such as increased flexibility, it may be desired to perform the data transmission through a packet network, also for mission critical networks. In this case, the data integrity inherent in time division multiplexed (TDM) networks may no longer be present. To some extent, such as for a non-hostile environment, Multipath Label Switching Transport Profile (MPLS-TP) allows some advantages of the connection oriented paradigm to be harnessed. Nevertheless, during overload situations and malfunction, an end-to-end data path or link cannot be seen as a direct wired connection. The strong manipulation capabilities of packet networks, like deleting, duplicating and adding packets to or from the stream, offer very significant dangers with regard to cyber attacks.

It would be desirable to provide end-to-end paths through timed deterministic packet networks, such as MPLS-TP, with enhanced security.

SUMMARY

It is an object of the invention to provide improved methods, devices, and systems for data transmission in packet networks affording enhanced security. It is in particular an object to provide improved methods, devices, and systems that are operative to provide encrypted and/or authenticated data transmission in a timed deterministic packet network, while offering high robustness to cyber attacks.

According to exemplary embodiments, methods and devices are provided for deterministically transiting encrypted and authenticated data packets across complex and meshed network topologies. For such networks, such as Multipath Label Switching Transport Profile (MPLS-TP) networks a coherent association of protected end-to-end paths with their respective cyber secure redundant data link endpoints are provided.

For security reasons, the two subsystems—a packet switching subsystem responsible for the paths through the packet network and a cyber security (or crypto) subsystem—may be kept strongly separated, but nevertheless synchronized. A dynamic protocol may be used to support a limited information exchange from the cyber security subsystem to the packet switching subsystem. This allows the two subsystems to be kept in synchronization, during all standard and exceptional states of network operation.

In exemplary embodiments, no packet addition is required and the same delay for all packets can be maintained during encryption steps. A cipher engine that performs encryption/decryption and/or authentication may add control information to dummy packets that have previously been generated by a packet engine separate from the cipher engine. The packet engine may also enlarge inter-packet gaps when needed, so as to avoid any disturbance that might otherwise result from cipher engine encryption information insertion needs to encrypt packets. This enhances protocols like Multipath Label Switching (MPLS) or other protocols for timed deterministic packet transmissions to be truly cyber secure.

In exemplary embodiments, a protected MPLS-TP end-to-end service setup may be linked with the respective cyber secure redundant encryption endpoints, also referred to as cipher engines. A clear separation of cyber security management and MPLS path management and a designed-in restriction via hardware, that may limit the information exchange between the MPLS and cyber security subsystems, may avoid any intrusion from the client node into the cipher engine or into another component of the cyber security subsystem.

According to an aspect of the invention, a method of providing secure communication over end-to-end data paths (which may be provided by MPLS tunnels) in a packet network is provided. The packet network is a timed deterministic packet network comprising a plurality of packet engines that perform packet handling. The method comprises performing, by a plurality of cipher engines, at least one cyber security function, wherein each cipher engine of the plurality of cipher engines is respectively associated with a respective packet engine of the plurality of packet engines and provided separately from the respective packet engine. At least some of the cipher engines are respectively provided between a respective packet engine associated with an endpoint node of the packet network and a network facing port of the endpoint node, or between the respective packet engine associated with the endpoint node and a first transit node connected to the endpoint node. The method further comprises centrally controlling, by a cipher engine and key manager, CEKM, the plurality of cipher engines.

The method may be used to perform end-to-end encryption and/or authentication, or for encryption and/or authentication along one or several segments of an end-to-end data path.

Controlling the plurality of cipher engines may comprise providing configuration information to the plurality of cipher engines and/or coordinating which keys are used by the plurality of cipher engines in the network.

By using a central control to coordinate operation of all cipher engines in the network and by using cipher engines that are physically separated from the packet engines, high security can be attained.

A packet engine and associated cipher engine may respectively be provided in a Label Edge Router (LER) or a Label Switch Router (LSR) of a MPLS network.

The packet network may comprise a plurality of LERs. Each LER may comprise at least two packet engines and at least four cipher engines. The two packet engines may respectively be provided for working and protection paths, which may be different paths through the MPLS network. Two cipher engines may be connected to a first packet engine of the LER to provide for end-to-end or segment encryption and/or authentication along a working path through the MPLS network, for two opposite transmission directions along the working path. Two further cipher engines may be connected to a second packet engine of the LER to provide for end-to-end or segment encryption and/or authentication along a protection path, for two opposite transmission directions along the protection path.

The method may further comprise setting up, by a centralized packet flow path manager, PFPM, endpoint nodes and intermediate transit nodes of the end-to-end data paths of the packet network.

The PFPM may set up packet engines in the LERs, which are examples for endpoint nodes in an MPLS network.

The PFPM may set up packet engines in the LSRs, which are examples for intermediate transit nodes in an MPLS network.

The PFPM may be communicatively connected to all endpoint nodes (e.g., the packet engines in all LERs) and all intermediate transit nodes (e.g., the packet engines in all LSRs) of the packet network.

The CEKM may be executed on a first server and the PFPM may be executed on a second server different from the first server. By separating the control systems for path control and cyber security, additional security benefits are attained.

The method may further comprise restricting information provided by the first server to the second server. Additional security benefits are attained thereby.

The method may further comprise discovering, by the CEKM, hardware defined identifiers of the plurality of cipher engines, and providing, by the CEKM, the hardware defined identifiers to the PFPM.

The CEKM may provide only the hardware defined identifiers and alarms to the PFPM. The alarms may indicate abnormal operating conditions.

The CEKM may receive information relating to a data flow topology of an end-to-end data path from the PFPM for configuring the plurality of cipher engines. The information may comprise a tunnel-identifier, an MPLS label or label stack, and similar information.

The CEKM and the PFPM may communicate via a secure channel.

The CEKM may be communicatively connected to each one of the plurality of cipher engines.

The CEKM may communicate with each one of the plurality of cipher engines via a secure protocol for configuring the cipher engines and/or for notification.

The method may further comprise selecting, by a cipher engine of the plurality of cipher engines, bits from a data packet using a bit window, the bit window being programmable. The bits selected according to the programmable bit window may identify data packets that are to be processed by the cipher engine.

The bit window may be different at an entry node and an exit node of an end-to-end data path.

Information exchanged between the CEKM and the PFPM may be used for configuring the bit window.

The method may further comprise configuring, by the CEKM, a first cipher engine associated with a first endpoint node and a second cipher engine associated with the first endpoint node of an end-to-end tunnel, respectively based on information from the PFPM. The first and second cipher engines may respectively perform cyber security functions, such as encryption or authentication, for working and protection paths of a protected tunnel through an MPLS network.

The method may further comprise configuring, by the CEKM, a third cipher engine associated with the first endpoint and a fourth either engine associated with the first endpoint node for a reverse transmission direction on the end-to-end tunnel. The third cipher engine and the fourth cipher engine may respectively perform the cyber security functions, such as encryption or authentication, for the working and protection paths through the MPLS network, respectively for a reverse flow direction.

The packet network may comprise a label edge router (LER). The label edge router may comprise a first cipher engine for a working path of a Multi Label Protocol Switching (MPLS) tunnel and a second cipher engine for a protection path that provides protection for the protected tunnel. The LER may comprise a third cipher engine for a reverse transmission direction on the working path and fourth cipher engine for a reverse transmission direction on the protection path.

The LER may comprise at least two packet engines.

The packet network may comprise a label switch router (LSR). The LSR may comprise at least two packet engines. The LSR may comprise at least two cipher engines, or at least four cipher engines. The cipher engines may be required for section encryption and because one node can work in a hybrid LER and LSR mode.

The method may further comprise pre-shaping, by a packet engine, a flow of data packets entering a cipher engine to assure that positions of the data packets in a traffic flow remain unchanged and all packets experience the same delay upon passage through the cipher engine.

The flow of data packets may be pre-shaped such that time stamping information of the data packets entering the cipher engine is still valid when the data packets leave the cipher engine.

Pre-shaping the flow of data packets may comprise enlarging, by the packet engine, an inter-packet gap before the flow of data packets enters the cipher engine.

Pre-shaping the flow of data packets may comprise inserting, by the packet engine, dummy packets into the flow of data packets before the flow of data packets enters the cipher engine. The cipher engine may use the dummy packets for inserting control information thereinto.

The plurality of packet engines and the plurality of cipher engines may use a common global information entity to assure a global identification of data packets belonging to the same traffic flow.

The global information entity may indicate a Multiprotocol Label Switching, MPLS, path.

Data packets may be encrypted by a cipher engine immediately after leaving an associated packet engine. Data packets may be decrypted by a cipher engine immediately before entering an associated packet engine.

The data packets may be encrypted or decrypted using a standardized protocol, in particular a standardized protocol selected from a group consisting of AES, DES, Triple-DES, or an open protocol, in particular an open protocol selected from a group consisting of Blowfish, Twofish, MARS, RC6, Rijndael, and Serpent.

The method may further comprise distributing, by the CEKM, keys for encrypting and decrypting the data packets.

The plurality of cipher engines may perform message authentication.

The message authentication may be performed using a standardized protocol based on hash functions, in particular a standardized protocol selected from a group consisting of MD5, SHA-1, SHA-2, and SHA-3, or an open source protocol.

The method may further comprise propagating, by a cipher engine, traffic loss information to an interface of the associated packet engine to trigger a traffic switch-over.

Propagating the traffic loss information may be triggered by a failure of an optical data connection detected by a wide area network, WAN, facing line interface.

The method may further comprise monitoring a health of a data flow.

Monitoring the health of a data flow may comprise sending an additional stream of data packets by the packet engine.

The additional stream of data packets may comprise monitoring packets that are encrypted by the cipher engines, and/or ping and trace route message that are left unencrypted.

Each cipher engine may respectively perform the cyber security function, such as encryption and/or authentication, without packet addition and without inter-packet gap enlargement performed by the cipher engine.

The plurality of packet engines may perform time stamping, for example at a port of the packet engines.

The plurality of packet engines may operate inside a time stamping context, and the plurality of cipher engines may operate outside a time stamping context of the packet network. By using cipher engines that are unaware of time stamping protocols, complexity can be reduced.

The cipher engines may operate independently of time stamping of data packets.

The cipher engines may be non-time-aware and non-topology-aware cipher engines.

The packet network may be an industrial automation control network.

The packet network may be a packet network for automation of high voltage lines, steering high speed trains, or controlling air traffic.

The CEKM may be a first server performing a cipher engine and key management function.

The PFPM may be a second server performing a packet flow path management function.

According to another aspect of the invention, there is provided a cipher engine and key manager, CEKM, for securing communication over end-to-end data paths in a timed deterministic packet network having packet engines that perform packet handling, the packet network comprising a packet flow path manager, PFPM that configures traffic flow nodes of the packet network. The CEKM comprises a first interface to receive information on a data flow topology of an end-to-end data path from the PFPM, a second interface to provide configuration information to a plurality of cipher engines that are each associated with and provided separately from a respective packet engine, the plurality of cipher engines being configured to perform at least one cyber security function, and at least one processor configured to generate the configuration information based on the data flow topology.

The CEKM may be configured to discover hardware defined identifiers of the plurality of cipher engines and to provide the hardware defined identifiers to the PFPM.

The CEKM may be configured to block transmission of information other than the hardware defined identifiers and alarms to the PFPM.

The CEKM may be executed on a first server different from a second server on which the PFPM is executed.

The CEKM may be operative to communicate with the PFPM via a secure channel.

The CEKM may be operative to receive information relating to a data flow topology of an end-to-end data path from the PFPM for configuring the plurality of cipher engines.

The CEKM may be communicatively connected, via the second interface, to each one of the plurality of cipher engines.

The CEKM may be operative to communicate with each one of the plurality of cipher engines via a secure protocol for configuring the cipher engines and/or for notification.

Information exchanged between the CEKM and the PFPM may be used for configuring the bit window.

The CEKM may be operative to configure a bit window, respectively for each cipher engine, wherein the cipher engines select bits of a data packet according to the programmable bit window to determine whether the data packet is to be processed by the cipher engine.

The CEKM may be operative to configure the bit window differently for different cipher engines. For illustration, the bit window may be configured differently for the two endpoints of the encrypted end-to-end path.

The CEKM may be operative to configure the bit windows for the plurality of cipher engines, respectively based on information received from the PFPM.

The CEKM may be operative to configure a first cipher engine associated with a first endpoint node and a second cipher engine associated with the first endpoint node of an end-to-end tunnel, respectively based on information from the PFPM. The first and second cipher engines may respectively perform cyber security functions, such as encryption or authentication, for working and protection paths through an MPLS network.

The CEKM may be operative to configure a third cipher engine associated with the first endpoint node and a fourth either engine associated with the first endpoint node for a reverse transmission direction on the end-to-end tunnel. The third cipher engine and the fourth cipher engine may respectively perform the cyber security functions, such as encryption or authentication, for the working and protection paths through the MPLS network, respectively for a reverse flow direction than the first and second cipher engines.

The CEKM may be operative to configure two or four cipher engines associated with a second endpoint node of the end-to-end tunnel.

The CEKM may be operative to distribute keys for encrypting and decrypting the data packets to the plurality of cipher engines.

The CEKM may be a first server performing a cipher engine and key management function.

According to another embodiment, there is provided a cipher engine. The cipher engine comprises a first interface configured to be directly connected to a packet engine that performs packet handling for a timed deterministic packet network. The cipher engine comprises a second interface configured to be connected to a network facing port of an endpoint node or a transit node connected to the endpoint node. The cipher engine comprises a third interface configured to receive configuration information from a cipher engine and key manager, CEKM. The cipher engine is operative to perform a cyber security function, such as encryption/decryption and/or authentication, on data packets of a traffic flow through the cipher engine without changing an order of data packets in the traffic flow.

The cipher engine may be operative to perform the cyber security function without packet addition and by maintaining same delay for all packets.

The cipher engine may be operative to perform the security function without having information on a topology of the data network (i.e., being non-topology-aware) and without using time stamping information of the data packets (i.e., being non-time-aware).

The cipher engine may be operative to encrypt data packets immediately after the data packets leave an associated packet engine, or to decrypted data packets immediately before entering the associated packet engine.

The cipher engine may be operative to perform encryption and/or decryption using a standardized protocol, in particular a standardized protocol selected from a group consisting of AES, DES, Triple-DES, or an open protocol, in particular an open protocol selected from a group consisting of Blowfish, Twofish, MARS, RC6, Rijndael, and Serpent.

The cipher engine may be operative to perform message authentication. The message authentication may be performed using a standardized protocol based on hash functions, in particular a standardized protocol selected from a group consisting of MD5, SHA-1, SHA-2, and SHA-3, or an open source protocol.

The cipher engine may be operative to propagate traffic loss information to an interface of the associated packet engine to trigger a traffic switch-over.

The cipher engine may be operative to propagate the traffic loss information in response to a failure of an optical data connection detected by a wide area network (WAN) facing line interface.

The first interface of the cipher engine may be directly connected to the packet engine via at least one optical cable or at least one Ethernet cable.

A network according to an aspect of the invention comprises a plurality of packet engines that perform packet handling in a timed deterministic packet network; a packet flow path manager, PFPM, operative to provide configuration information to traffic flow nodes of the packet network; a plurality of cipher engines according to an embodiment, the cipher engines being respectively operative to receive data packets of a traffic flow from an associated packet engine or to provide data packets of the traffic flow to the associated packet engine; and a cipher engine and key manager, CEKM, according to an embodiment that is coupled to the PFPM server and the plurality of cipher engines.

The network may be a network of an industrial automation control system (IACS).

The PFPM may be operative to set up endpoint nodes and intermediate transit nodes of the end-to-end data paths of the packet network.

The PFPM may be operative to set up packet engines in the LERs, which are examples for endpoint nodes in an MPLS network.

The PFPM may be operative to set up packet engines in the LSRs, which are examples for intermediate transit nodes in an MPLS network.

The PFPM may be communicatively connected to all endpoint nodes (e.g., the packet engines in all LERs) and all intermediate transit nodes (e.g., the packet engines in all LSRs) of the packet network.

The PFPM may be a second server performing a packet flow path management function.

The CEKM may be operative to restrict information provided to the PFPM to hardware identifiers of the plurality of cipher engines and alarms.

Each cipher engine may respectively be operative to select bits from a data packet using a bit window, the bit window being programmable, wherein the bits selected according to the programmable bit window identify data packets that are to be processed by the cipher engine.

The CEKM may be operative to configure the programmable bit window.

The programmable bit window may be different at an entry node and an exit node of an end-to-end data path.

The network may comprise a label edge router (LER). The label edge router may comprise a first cipher engine for a working path of a Multi Label Protocol Switching (MPLS) tunnel and a second cipher engine for a protection path that provides protection for the working path.

The LER may comprise a third cipher engine for a reverse transmission direction on the working path and fourth cipher engine for a reverse transmission direction on the protection path.

The LER may comprise at least two packet engines.

The packet network may comprise a label switch router (LSR). The LSR may comprise at least two packet engines and at least four cipher engines.

The plurality of packet engines may respectively be configured to pre-shape a flow of data packets entering a cipher engine to assure that positions of the data packets in a traffic flow remain unchanged upon passage through the cipher engine.

The packet engine may be operative to pre-shape the flow of data packets such that time stamping information of the data packets entering the cipher engine is still valid when the data packets leave the cipher engine.

The packet engine may be operative to enlarge an inter-packet gap before the flow of data packets enters the cipher engine.

The packet engine may be operative to insert dummy packets into the flow of data packets before the flow of data packets enters the cipher engine.

The cipher engine may be operative to use the dummy packets for inserting control information thereinto.

The plurality of packet engines and the plurality of cipher engines may be operative to use a common global information entity to assure a global identification of data packets belonging to the same traffic flow.

The global information may indicate a Multiprotocol Label Switching, MPLS, path.

The network may be operative to perform health monitoring of a data flow. Monitoring the health of a data flow may comprise sending an additional stream of data packets. The additional stream of data packets may comprise monitoring packets that are encrypted by the cipher engines, and/or ping and trace route message that are left unencrypted.

Each cipher engine may respectively be operative to perform the cyber security function, such as encryption and/or authentication, without packet addition and by maintaining same delay for all packets by the cipher engine.

The plurality of packet engines may respectively be operative to perform time stamping, for example at a port of the packet engines.

The plurality of packet engines may respectively operate inside a time stamping context, and the plurality of cipher engines may operate outside a time stamping context of the packet network. By using cipher engines that are unaware of time stamping protocols, complexity can be reduced.

The cipher engines may operate independently of time stamping of data packets.

The cipher engines may be time-unaware and topology-unaware cipher engines.

The packet network may be a network of an IACS.

The packet network may be a packet network for automation of high voltage lines, steering high speed trains, or controlling air traffic.

According to another embodiment, there is provided a PFPM operative as explained in association with the network.

The methods, devices, and systems for transmission of encrypted and/or authenticated data across complex, meshed packet network topologies provide enhanced security for timed networks.

Embodiments of the invention may be employed in mission critical packet networks, such as automation of high voltage lines, without being limited thereto.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of exemplary networks, such as Multiprotocol Label Switching (MPLS) networks or MPLS-Transport Profile (MPLS-TP) networks, the methods and devices described in detail below may generally be used for transmission of encrypted and authenticated data through meshed, complex packet network topologies.

While embodiments will be described in which end-to-end encryption and/or authentication is performed, the techniques disclosed herein may also be used for encryption and/or authentication along segments of an end-to-end path.

In embodiments disclosed herein, both working and protection paths may be established to form a bi-directional protected tunnel. As used herein, the term "working path" may in particular refer to a path that carries traffic during normal network operation, and the term "protection path" may in particular refer to a path used to protect and transport traffic when the working path fails, in accordance with RFC 7087, entitled "MPLS-TP Rosetta Stone" (December 2013), sections 3.42.1 and 3.42.2 and RFC 6372, entitled "MPLS-TP Survivability Framework" (September 2011). Entities, such as packet or cipher engines along the working path, are working entities in accordance with RFC 7087, entitled "MPLS-TP Rosetta Stone" (December 2013), section 3.42.1. Entities, such as packet or cipher engines along the protection path, are protection entities in accordance with RFC 7087, entitled "MPLS-TP Rosetta Stone" (December 2013), section 3.42.2.

As used herein, the term "packet" refers to a packetized data structure. The term "packet", as used herein, may include data frames. A packet may be or may encompass a data frame.

A "cipher engine", as described herein, may be implemented as a cipher engine instance. One hardware implementation of a cipher engine may provide plural cipher engine instances, e.g., an instance per port and direction. The cipher engine hardware may, however, in any case be separate from the respective packet engine.

The features of embodiments may be combined with each other, unless specifically noted otherwise.

Figure 1:
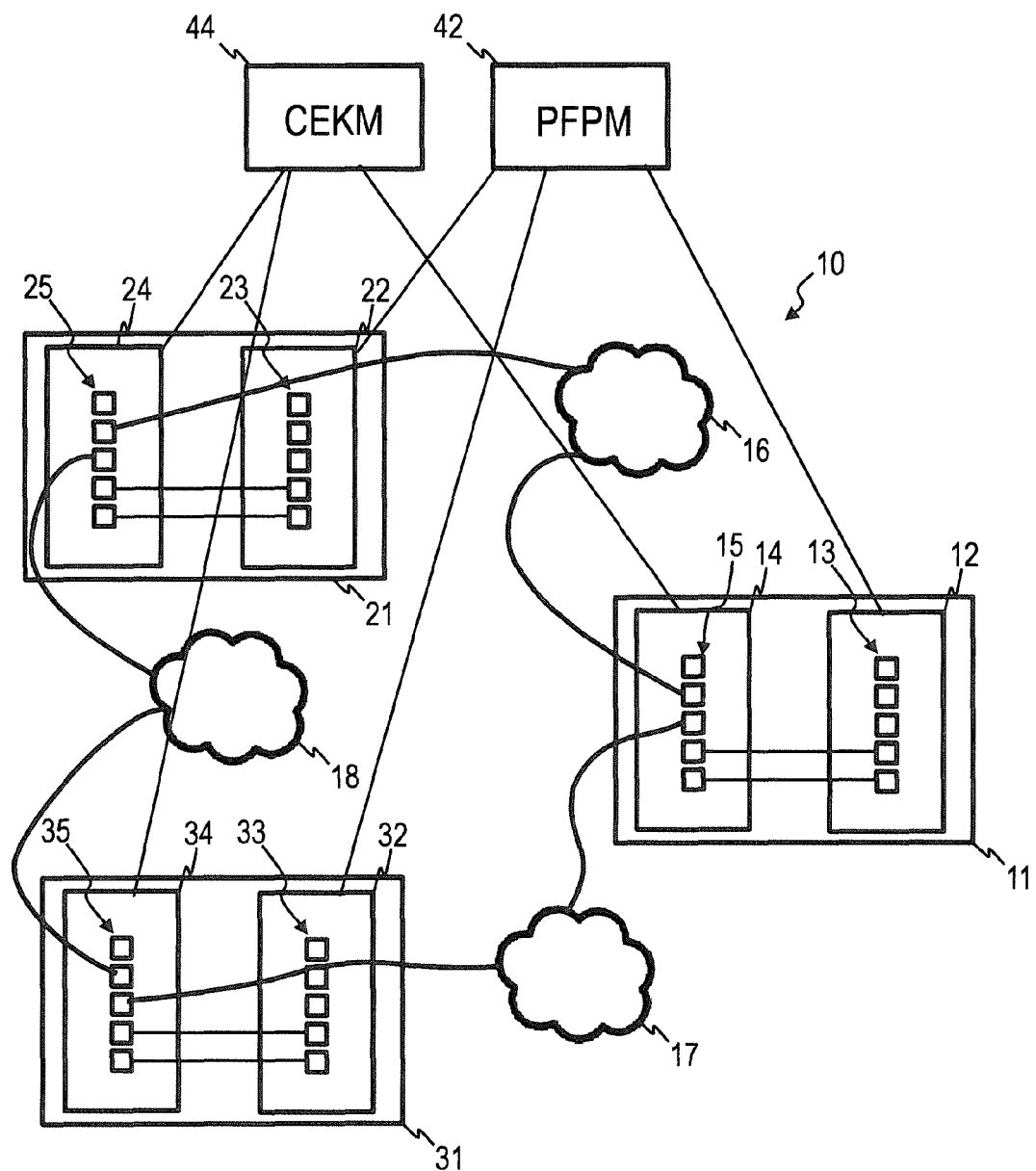
FIG. 1 is a schematic representation of a network comprising packet engines and cipher engines according to an embodiment.

FIG. 1 is a schematic representation of a network 10. The network 10 may comprise a timed deterministic packet network. The packet network may have a plurality of nodes 11, 21, 31. The plurality of nodes 11, 21, 31 may respectively be communicatively coupled via a MPLS-TP network 16, 17, 18. The plurality of nodes 11, 21, 31 may include endpoint nodes and intermediate nodes (or hops) of a transmission path. For a MPLS-TP network, the endpoint nodes may be label edge routers (LERs), and the intermediate nodes may be label switch routers (LSRs). The packet network may be a timed network, with time stamping being performed by packet engines of the nodes 11, 21, 31.

The nodes 11, 21, 31 may respectively include a packet engine 12, 22, 32 and a cipher engine 14, 24, 34 that is physically separate from the associated packet engine 12, 22, 32. Each cipher engine 14, 24, 34 may be directly coupled to the associated packet engine 12, 22, 32, e.g., via Ethernet cables or via optical cables. Opposite ends of the Ethernet cables or optical cables may be directly attached to a packet engine 12, 22, 32 and a cipher engine 14, 24, 34.

As used herein, the term "cipher engine" refers to a device operative to perform encryption/decryption and/or authentication operations. The cipher engine may optionally have dedicated components such as a physical random number generator for performing encryption/decryption and/or authentication operations.

It will be appreciated that each cipher engine hardware 14, 24, 34 may have a plurality of cipher engine instances, which may correspond to different ports or to different port and packet flow direction at the respective node.

As used herein, the term "packet engine" refers to a device operative to perform packet handling. The packet engine may include a packet switch, and may insert dummy packets into a flow of data packets. The packet engine is time-aware and may be operative to perform time stamping, e.g., at an egress port or an ingress port of the packet engine.

As used herein, a statement that an entity is disposed "between" two other entities (such as a cipher engine being disposed between a packet engine and a first transit node) describes the arrangement along the data flow path, i.e., the sequence in which packets pass through the entities.

Each packet engine 12, 22, 32 may respectively have a plurality of ports 13, 23, 33. Each cipher engine 14, 24, 34 may respectively have a plurality of ports 15, 25, 35. An ingress port of a cipher engine 14, 24, 34 may respectively be connected with an egress port of the associated packet engine 12, 22, 32. An egress port of a cipher engine 14, 24, 34 may respectively be connected with an ingress port of the associated packet engine 12, 22, 32. Each cipher engine 14, 24, 34 may be coupled to its associated packet engine 12, 22, 32 via an unencrypted link.

Different cipher engines 14, 24, 34 may transmit data traffic via encrypted paths, e.g., through the MPLS-TP network.

The packet engines 12, 22, 32 are respectively responsible for packet handling. The packet engines 12, 22, 32 may be responsible for packet forwarding, respective switching. All packet handling, filtering and queuing is done in the packet engines 12, 22, 32.

The cipher engines 14, 24, 34 perform encryption and/or authentication operations. It will be understood that the term "encryption operations" as used herein generally includes operations associated with encrypted transmissions and, thus, may encompass decryption at the receiving endpoint of a secure end-to-end path.

The cipher engines 14, 24, 34 may respectively have dedicated hardware such as a physical random number generator for performing encryption/decryption and/or authentication operations.

As will be explained in more detail below, the packet engines 12, 22, 32 and cipher engines 14, 24, 34 arc operative to transmit encrypted and/or authenticated data across complex, meshed packet network topologies, while providing end-to-end or segment encryption and/or authentication.

The packet engines 12, 22, 32 may be controlled by a central control, e.g., a packet flow path manager (PFPM) 42. The cipher engines 14, 24, 34 may be controlled by a cipher engine and key manager (CEKM) 44. The functions of the PFPM 42 and the CEKM 44 may be performed on separate servers for enhanced security. The PFPM 42 may configure the packet engines to set up MPLS paths. The CEKM 44 may configure the cipher engines, using information on the paths that arc set up by the PFPM 42. The cipher engines 14, 24, 34 may respectively ensure end-to-end or segment encryption and/or authentication for the paths through the network. The CEKM 44 may be communicatively coupled to all cipher engines 14, 24, 34, e.g., via secure channels.

A first subsystem formed by the PFPM 42 and the plurality of packet engines 12, 22, 32 is responsible for packet handling, such as by setting up flow paths. A second subsystem formed by the CEKM 44 and the plurality of cipher engines 14, 24, 34 is responsible for cyber security functions. A first management network of the first subsystem, which connects the PFPM 42 and the plurality of packet engines 12, 22, 32, may be separate from a second management network of the second subsystem, which connects the CEKM 44 and the plurality of cipher engines 14, 24, 34.

By using a network wide, central coordination of the plurality of cipher engines 14, 24, 34 in the network, end-to-end or segment tunnel payload encryption and/or authentication can be realized.

By using cipher engines 14, 24, 34 that are provided as separate devices from the respective associated packet engines 12, 22, 32, the cipher engines 14, 24, 34 are provided separately from the devices that are responsible for time stamping and switching. The cipher engines 14, 24, 34 do not need to be aware of the topology of the network and/or the end-to-end paths set up therein. The cipher engines 14, 24, 34 do not need to be aware of any time stamping protocol. Unauthorized intrusion may be prevented on hardware level.

Because the PFPM 42 and the CEKM 44 run on separate servers and use separate management networks, security can be enhanced.

Figure 2:
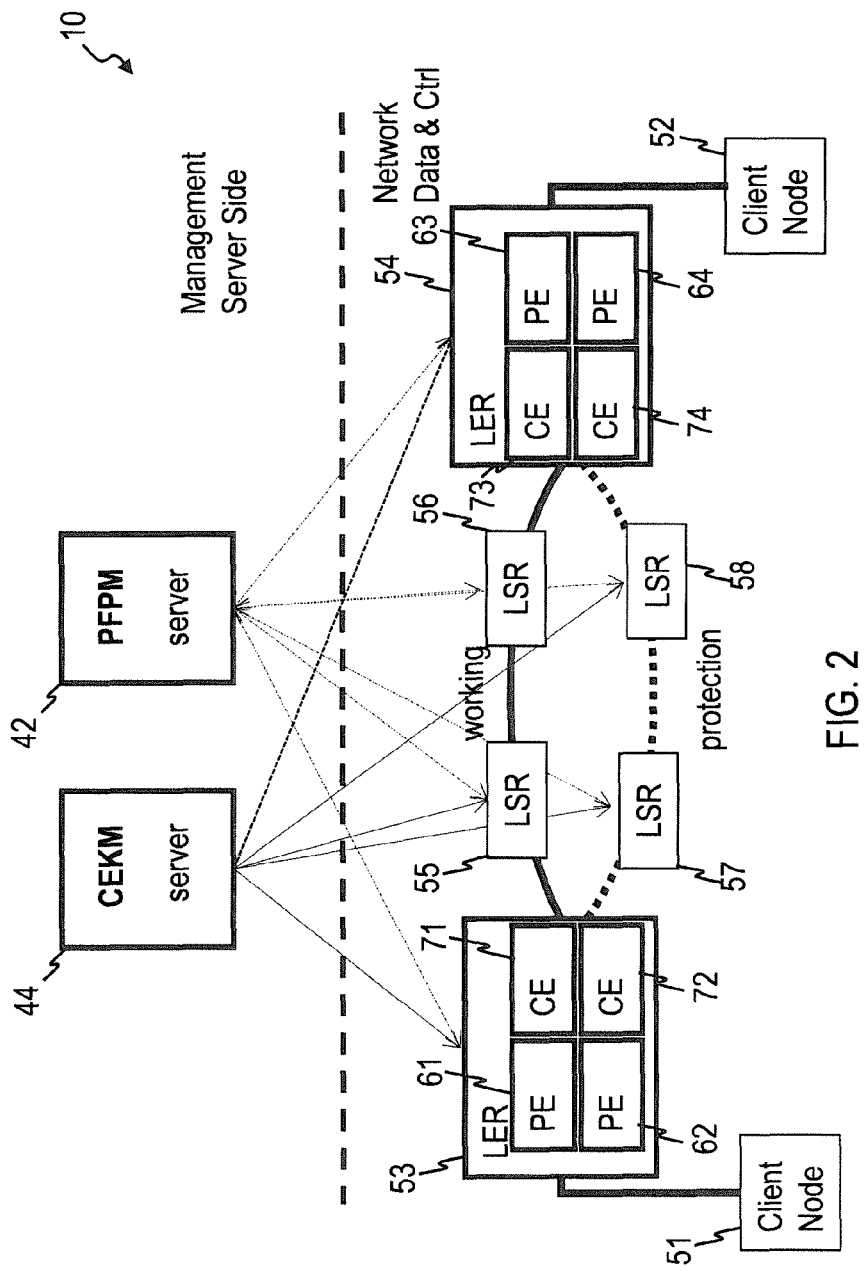
FIG. 2 is a schematic representation of a network comprising packet engines and cipher engines according to an embodiment.

FIG. 2 is a block diagram representation of a network 10. The network 10 comprises a PFPM 42 and a CEKM 44, which may be executed on different servers.

The packet network may use MPLS-TP as data network technology. The packet network may comprise label edge routers (LERs) 53, 54, respectively connected to client nodes 51, 52. The LERs 53, 54 are the endpoints of an encrypted end-to-end tunnel. The packet network may comprise label switch routers (LSRs) 55, 56, 57, 58. A working path may be set up between the LERs 53, 54 via LSRs 55, 56. A different protection path may be set up between the LERs 53, 54 via LSRs 57, 58. The protection path may provide redundancy for data transmissions, to protect the working path, as described in more detail in, e.g., RFC 6372, entitled "MPLS-TP Survivability Framework" (September 2011) and RFC 7087, entitled "MPLS-TP Rosetta Stone" (December 2013), sections 3.42.1 and 3.42.2.

The LER 53, which is an endpoint node of an end-to-end path that is to be secured, comprises at least one packet engine (PE) and at least one cipher engine (CE). As illustrated, the LER 53 may comprise at least two packet engines 61, 62. The LER 53 may comprise two cipher engines 71, 72 or more than two cipher engines. While only two cipher engines 71, 72 are illustrated in FIG. 2, the LER 53 may comprise at least four cipher engines, as will be explained in more detail with reference to FIG. 7.

The LER 54, which is another endpoint node of an end-to-end path that is to be secured, comprises at least one packet engine (PE) and at least one cipher engine (CE). As illustrated, the LER 54 may comprise at least two packet engines 63, 64. The LER 53 may comprise two cipher engines 73, 74 or more than two cipher engines. While only two cipher engines 73, 74 are illustrated in FIG. 2, the LER 54 may comprise at least four cipher engines (at least some of which may be cipher engine instances), as will be explained in more detail with reference to FIG. 7.

Each LSR 55, 56, 57, 58 may respectively comprise at least one packet engine and at least one cipher engine. Each LSR 55, 56, 57, 58 may comprise at least two packet engines and at least four cipher engines, as will be explained in more detail with reference to FIG. 6.

In operation, the PFPM 42 may set up the packet engines of the endpoint nodes and the intermediate nodes of the packet network. The cipher engines do not need to be aware of the topology. Rather, the CEKM 44 can detect hardware identifiers of all cipher engines and provide the hardware identifiers to the PFPM 42. The PFPM 42 can provide information relating to the set-up paths to the CEKM 44. The CEKM 44 can use the information on the set-up paths when configuring the cipher engines.

The cipher engines 71, 72 in the endpoint node 53 are placed inside the endpoint node 53, between the respective packet engine 61, 62 and the network facing interface of the endpoint node 53. The cipher engines 71, 72 may generally be provided between the packet engine 61, 62 and the first intermediate node (referred to as first hop for MPLS-TP) 55, 57. Similarly, the cipher engines 73, 74 in the endpoint node 54 are placed inside the endpoint node 54, between the respective packet engine 63, 64 and the network facing interface of the endpoint node 54. The cipher engines 73, 74 may generally be provided between the packet engine 63, 64 and the first intermediate node (referred to as first hop for MPLS-TP) 56, 58. The first intermediate node or first hop is the node closest to the endpoint node along the working or protection path, respectively.

Time stamping is performed by the packet engines 61, 62, 63, 64. For illustration, a port of the packet engines 61, 62, 63, 64 connected to the cipher engine 71, 72, 73, 74 may perform time stamping in accordance with the Precision Time Protocol (PTP), IEEE 15888.

Via utilizing central control and network-wide coordination of the additional cipher engines 71, 72, 73, 74, a timed (utilizing, e.g., PTP), protected and deterministic packet network (like MPLS) can be enhanced with cyber security functions, like end-to-end traffic encryption and/or packet authentication. The cipher engines 71, 72, 73, 74 may be non-topology-aware and non-time-aware, and may be located outside time stamping context between the packet engine 61, 62, 63, 64 and next hop, so either between endpoint node of packet flow (for MPSL, e.g., the LER 54) and the first transit node of packet flow (for MPLS, e.g., the LSR 56, 58), or inside the endpoint node 53, 54 between packet engine and network facing port.

To secure integrity and authentication of data transmission in the packet network, frame data is encrypted and/or authenticated by the cipher engines 71, 72, 73, 74. As a consequence, a major part of the packet in a data stream may be replaced by its encrypted and/or authenticated counterpart. The encryption/authentication is performed in the cipher engine 71, 72, 73, 74, separated from the packet engine 61, 62, 63, 64, responsible for packet forwarding, respective switching. All packet handling, filtering and queuing may be done in the packet engine 61, 62, 63, 64, which can also perform time stamping of PTP packets which as a final result establishes accurate time/clock at every node. The cipher engine 71, 72, 73, 74 may respectively be connected to a network facing port of a central card, which then itself is connecting to the network.

To maximize security, interaction between the cyber security subsystem 44, 71, 72, 73, 74 and the packet network subsystem 42, 61, 62, 63, 64 may be reduced. The only information available to the packet network subsystem 42, 61, 62, 63, 64 about the cipher engines 71, 72, 73, 74 may be restricted to unit inventory information, such as a hardware defined identifier, and optionally alarms indicating an abnormal operating condition. Only the MPLS label, the tunnel ID, and crypto profile-id is provided by the PFPM 42 to the CEKM 44, per engine, tunnel and direction across a secure link, e.g. across a secure SSH link.

In operation, the initial MPLS label is set by the LER 54, which may also be referred to as provider edge router. This labeled packet can leave the port attached to the cipher engine 73, 74, which serves as one crypto endpoint. Subsequent hops—from LSR to LSR—forward the packet.

The cipher engines of the intermediate transit nodes, i.e., the LSRs 55, 56, 57, 58, are configured by the CEKM 44 such that they do not perform decryption or encryption of an encrypted data packet output by a cipher engine of a LER 53, 54 when an end-to-end encryption is performed. For illustration, the cipher engines of the intermediate hops, i.e., the LSRs 55, 56, 57, 58, may have lookup table which identifies paths for which encryption/decryption is to be performed. The lookup table of the intermediate hops is configured by the CEKM 44 such that a path of an MPLS end-to-end tunnel merely passing through the LSR does not trigger decryption or encryption, if end-to-end encryption is to be provided.

As will be explained in more detail below, cipher engines may respectively select bits from a data packet according to a programmable bit window to determine whether the data packet is to be processed. The programmable bit window may be configured by the CEKM 42. The lookup table of the cipher engines of the intermediate hops, i.e., the LSRs 55, 56, 57, 58, may be set such that no decryption or encryption is triggered until the final hop is reached.

If encryption is to be performed for only segments of an end-to-end path, the LSRs 55, 56, 57, 58 may also be programmed such that decryption can be performed at the end of a segment.

When the data packet has reached the final hop, i.e., the cipher engine in the LER 53, 54, lookup for decryption is successful. The packet is decrypted and sent to the packet engine of LER router. In order to cause the cipher engine 71, 72 to decrypt a data packet having belonging to a certain tunnel, the CEKM 44 may configure the cipher engine 71, 72 to have lookup table information that causes data packets of the respective tunnel ending at the endpoint node 53 to be decrypted.

Figure 4:
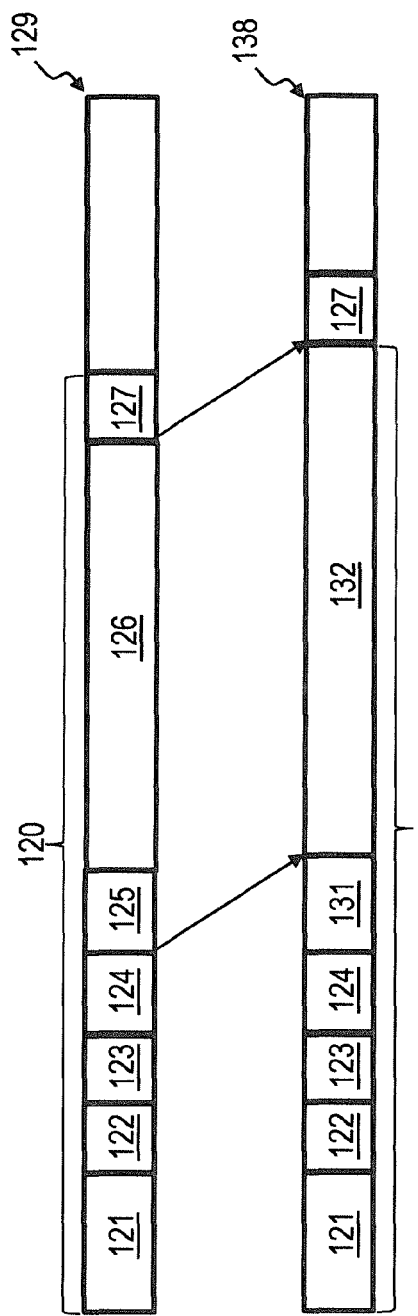
FIG. 4 is a diagram illustrating a data packet prior to and after an encryption operation.
Figure 5:
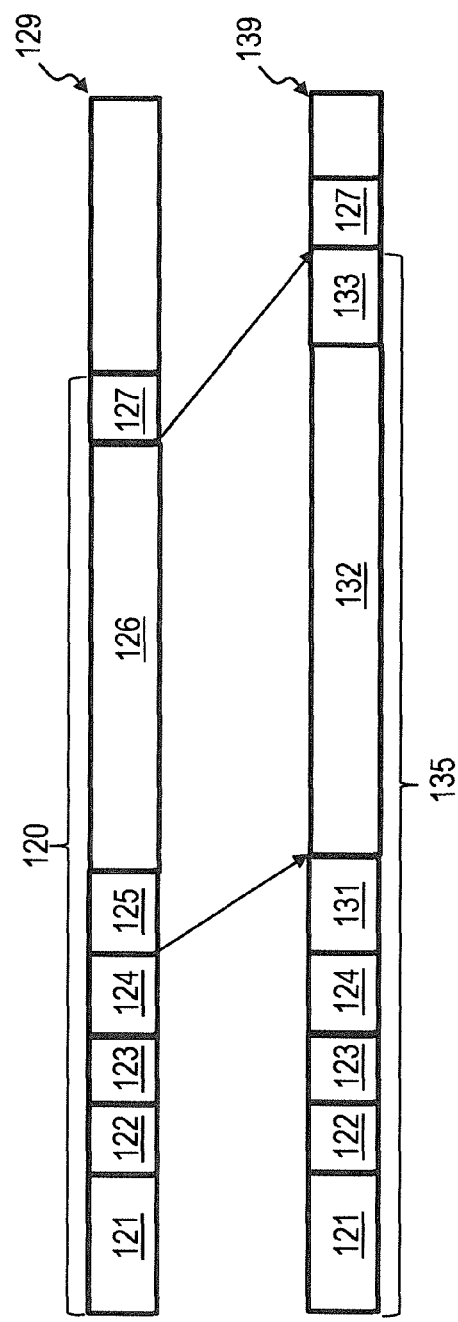
FIG. 5 is a diagram illustrating a data packet prior to and after encryption and authentication operations.

At the intermediate nodes, i.e., the LSRs 55, 56, 57, 58, configuration of the cipher engines assure that payload remains untouched. The L2-MAC addresses, next hop MPLS label, TTL field and the FCS field, which will be explained in more detail with reference to FIG. 4 and FIG. 5, are the only information that is changed.

A protected MPLS tunnel with its working path and protection path is treated as two encrypted connections. Per MPLS tunnel pair, there are four cipher engines acting as endpoints of the secured tunnel. The four cipher engines are identified and kept synchronized between cyber security subsystem 44, 71, 72, 73, 74 and the packet network subsystem 42, 61, 62, 63, 64.

The operation of the PFPM 42, the CEKM 44, the packet engines, and the cipher engines will be described in more detail with reference to FIG. 3 to FIG. 12.

Figure 3:
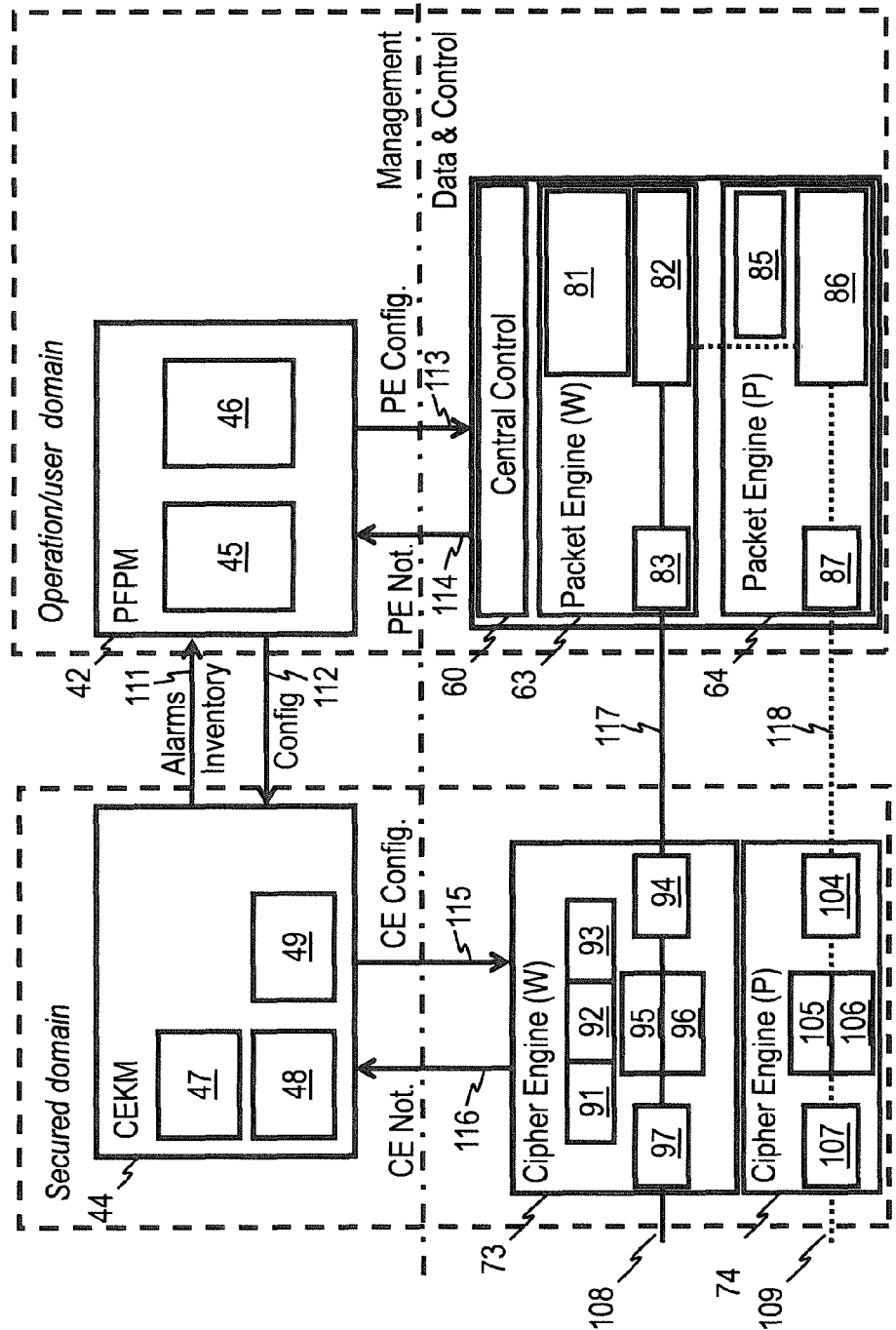
FIG. 3 is a block diagram of components of a network according to an embodiment.

FIG. 3 is a schematic block diagram of components of a network.

The PFPM 42 may be a MPLS path manager (MPM). The PFPM 42 may be implemented by software or other computer-readable instruction code executed on a second server. The PFPM 42 may comprise a topology, path, and cipher profile manager 45. The PFPM 42 may comprise an operation and maintenance and device monitoring module 46.

The centralized PFPM 42 sets up data traffic endpoints 53, 54 together with intermediate transit points 55, 56, 57, 58. The PFPM 42 may be connected for configuration and/or notification to control all nodes in the network.

To handle the packet forwarding, the PFPM 42 may hold an information model for
    data forwarding and termination parameters, like MPLS label to VLAN tag mapping via attachment circuits, inner/outer label setup/mapping to network end-to-end tunnels, class of service identifiers, and
    respective networking topology information, like tunnels, pseudo wires, virtual private networks.

The CEKM 44 may communicate to all cipher engines via a secure protocol for configuration and/or notification. Necessary information 112 related to the data flow topology, which is necessary for configuration of the cipher engines, is provided by the PFPM 42 to the CEKM 44.

The CEKM 44 may include a master key generator 47, a key manager 48, and a path endpoint manager 49. The CEKM 44 may hold and manage the respective encryption endpoint information:

Master keys to be used to generate session keys.

Label information, which is used to identify packets where a session key has to be applied.

Engine id identifies engines where above information has to be applied.

For normal use, i.e., once the network has been set up and if no maintenance or testing is performed, the user has no access to the CEKM 44. A user having access to the PFPM 42 will not have access to any protected information from the cyber security subsystem, increasing the overall security and robustness of the solution.

The LER may comprise plural packet engines, e.g., a first packet engine 63 for a working (w) path 117 and a second packet engine 64 for a protection (p) path 118. The packet engine 63, 64 may respectively comprise a port 83, 87 connected to an associated cipher engine 73, 74. The port 83, 87 may be operative to perform time stamping. The port 83, 87 may be IEEE 1588 aware to perform time stamping according to PTP.

The packet engines 63, 64 may respectively comprise a packet switch 82, 86. The packet switch 82, 86 may be operative to perform pre-shaping of a flow of data packets. The pre-shaping may include enlarging the inter-packet gap to ensure that the cipher engine 73, 74 can grow data packets into the inter-packet gap and so maintain the same delay for all packets and without a change in packet order the by the cipher engine 73, 74. The pre-shaping may include generating dummy packets that are inserted into the flow of data packets output to the cipher engine 73, 74. The dummy packets may have an empty section, which may be filled with control information by the cipher engine 73, 74. This allows management channel information to be transmitted by the cipher engine 73, 74, without the need to generate additional packets by the cipher engine 73, 74.

The central processing unit 81 of the packet engine may not only operate as dummy packet controller (DPC), but may respectively perform additional functions, such as software configuration management (SCM), Operation and Maintenance (OAM), and path controller.

A central control 60 of the LER may perform control and/or management functions for plural packet engines, respectively based on packet engine (PE) configuration information 113 received from the PFPM 42. The central control 60 may provide packet engine (PE) notifications 114 to the PFPM 42. The central control 60 may convey the PE configuration information 113 to the CPUs 81, 85 for use in path control and/or dummy packet generation, for example.

The cipher engines 73, 74 for the working and protection paths may respectively comprise a port 94, 104 directly connected to a packet engine and a network facing port 97, 107. The cipher engines 73, 74 may respectively comprise components for encryption 95, 105 and/or decryption 96, 106 and/or components for authentication. The cipher engines 73, 74 may respectively comprise a physical random number generator 91, which may be a quantum random number generator (QRNG). The cipher engines 73, 74 may respectively comprise a key storage element 92. The cipher engines 73, 74 may respectively comprise an identifier storage element 93 storing a hardware identifier, such as a board-id that is unique in the network, of the respective cipher engine.

The cipher engines 73, 74 may use a programmable bit window, which selects bits from a data packet. This mechanism can identify data packets from the traffic flow, which are to be processed by the cipher engine. The cipher engine may use a lookup table and compare the selected bits to information in the lookup table to determine whether a data packet is to be processed.

At network entry, packets having the same identifier will be encrypted/authenticated via the same keys and/or process, so as to belong to the same data flow. In MPLS, such a data flow is called bidirectional label switched path pair. At exit—based on the same mechanisms—the traffic will be decrypted/identified. In general, flow identifiers can change at every hop. In MPLS, the MPLS labels can change at every hop. Accordingly, the bit window and window content have to be considered as being different at entry or exit. The PFPM 42 and CEKM 44 ensure this via feeding the CEKM 44 function with proper entry and exit identifiers and, optionally, auxiliary information 112.

An MPLS packet is originated at the packet engine 63. The data packet is sent over to the cipher engine 73 via a data link 117. By observing a predefined section of the packet and finding the pattern in a local lookup table, the cipher engine 73 gets the necessary keys and auxiliary information for performing encryption and/or authentication. In case lookup fails, the data packet is left untouched. At the remote end, the cipher engine (now in the decryption mode) examines the packet in comparison to its lookup table to get the respective key for decrypting the data packet.

Data packets having the same bit vector at the same engine (e.g., the same board-identifier), are encrypted using the same keys, and accordingly belong to the same data flow. In MPLS, such a data flow is called bidirectional label switched path that may belong to a protected tunnel. A tunnel-identifier (tunnel-id) identifies globally the MPLS tunnel and the crypto connection.

The bit pattern for encryption lookup may contain the top-of-stack label (path identifier) and additional bits (top-of-stack TTL value, bottom of stack label). This may prevent a match for OAM packets addressing intermediate hops. In this way, it is ensured that OAM packets, such as trace route, that must not be encrypted, remain unencrypted at intermediate hops.

The bit pattern for decryption lookup may contain the top-of-stack label (path identifier) and additional bits (top-of-stack S-bit, bottom of stack label) to distinguish encrypted packets from unencrypted OAM packets, e.g. trace route.

An example for label stack encoding will be described in more detail with reference to FIG. 8 below.

The CEKM 44 and the PFPM 42 exchange information via a secure channel 111, 112. The information may be used to set-up the bit windows in content and positions. For one protected tunnel, the PFPM 42 may configure the entry/encryption and exit/decryption engine, respectively for the working and protection path. This has to be done for each traffic direction. Two cipher engines have to be configured in an endpoint node for each bi-directional tunnel pair if the same cipher engine takes care of both directions. Four cipher engines have to be configured in one endpoint node for each bi-directional tunnel pair if separate cipher engines are provided for the two directions. Notification interface 111 provides alarms, or failures, and inventory information from the CEKM 44 to the PFPM 42.

The two information models at the PFPM 42 and the CEKM 44 are kept consistent via sending minimum configuration data from PFPM 42 to CEKM 44 for each cipher engine, via the configuration interface 112 and the alarm/notification interface 111. In case the PFPM 42 performs MPLS path management, a MPLS-tunnel is prepared with all necessary information for endpoint nodes and/or intermediate transit nodes. This may be triggered by the end user, when specifying the endpoints. Only after having received positive acknowledgement of CEKM 44, the PFPM 42 applies the path in the packet engines.

To setup up a coherent operation in the attached cipher engines, the PFPM 42 may control the flow of setting up the encrypted end-to-end path, via enforcing following steps:

When a user sets up the protected tunnel in the PFPM, via selecting the end points and specifying encryption profile and intermediate hop constrains, the system centrally auto-routes an initially simulated working and protection path. Thereby, the endpoints are identified.

For a protected tunnel, the PFPM 42 provides the required information for configuring entry/encrypting and exit/decrypting engine for working and protection path. This has to be done for each traffic direction. Four engines may be configured, two times for each of the two directions, in each endpoint node. Even though the data flow is encrypted inside a MPLS-TP tunnel, the unencrypted outer labels are changing at every hop. A tunnel-id can be used as global identifier for both the tunnel by the PFPM 42 and packet engines on the one hand, and by the CEKM 44 and cipher engines on the other hand.

The following steps may be performed:

Step A: To configure all cipher engines for one path of a protected tunnel, the following tupel is exchanged between PFPM 42 and CEKM 44: global engine address (i.e., hardware defined identifier of the cipher engines); tunnel-id; MPLS label; direction; and profile-id. The profile-id may identify a set of auxiliary information, like traffic types which should left untouched.

Step B: When having verified successful application of a configuration of the cipher engines, a pre-shaping parameter configuration may be applied to packet engines to ensure proper timing and ordering of the packet flow.

Step C: After having received positive confirmation from the CEKM 44 of successfully applying the above configuration, the PFPM 42 applies the configuration to the packet engines, to thereby set up a path; if no positive confirmation is received, the simulation in PFPM 42 may be rolled back, and the configuration is not applied.

Taking down a path involves the same acknowledgement, where now the path will be taken down in reverse order from step C to step A.

As the data flow is encrypted inside an end-to-end context (in MPLS-TP called tunnel), labels are changing at every hop. A special global information entity is used for both the PFPM and the packet engines connected thereto and the end-to-end or segment crypto or cyber secure connection with the CEKM and the respective cipher engines. In MPLS, the global information entity that may be used by both the secured domain and the operation/user domain may identify the tunnel. This assures global identification across hops, means across crypto or cyber security topology and MPLS topology.

The PFPM 42 may hold the information on data services, pseudo wires and tunnels with their label switched paths. With adding and subtracting MPLS services, items in the network information model may be changed and have to be kept coherent with packet engines and cipher engines. The network information model can be kept coherent with the packet engines directly via the data link 113. The network information model can be kept coherent with the respective cipher engines via the CEKM 44.

For illustration, the CEKM 44 will ensure that proper keys are used for an identified MPLS bi-directional tunnel on both ends for encryption/decryption. The CEKM 44 may discover all engines via a hardware-defined board-id. This is the only information on the cipher engines which is made available to both the PFPM 42 and the CEKM 44. The board-id, or another hardware-defined identifier, is unique across the network and identifies network wide the individual cipher engines. The tunnel-id, which is established during the set-up of end-to-end bidirectional tunnels, serves as the identifier for the end-to-end connection for both the cyber security subsystem (CEKM and cipher engines) and the packet flow subsystem (PFPM and packet engines). By providing the global engine address (board-id) and tunnel-id, MPLS label per direction, to the CEKM 44, the PFPM 42 may steer encryption, without interfering and without having any knowledge on the cipher engines other than possibly the hardware-defined identifiers. Together with a profile id, which selects one of a set of predefined engine parameters, exchange of board-id, tunnel-id, MPLS label and direction fully determines the behavior of the cyber security subsystem (i.e., CEKM and cipher engines)

Key distribution and other necessary configuration information 115 may be provided by the CEKM 44 down to the respective cipher engines 73, 74 for the working or protection paths, after the CEKM 44 has received topology information from path management function via the interface 112.

This allows coherent handling of MPLS-TP and cipher engine operation. The CEKM and PFPM respectively operate in a centralized manner, while the management of the cipher engines is decoupled from the management of the packet engines.

In view of high availability needs, two cipher engines 73, 74 may be provided, with a first cipher engine 73 being used for a working path and a second cipher engine 74 being used for a protection path of a protected tunnel pair. Two interfaces may connect to respective central card, and two interfaces may connect to the aggregation layer of the network. Via a dedicated logical link 115, 116, the cipher engines 73, 74 connect to the CEKM 44, potentially side by side with the PFPM 42. In addition a front interface per engine may be used for the initial bring up.

Packets are encrypted at the cipher engine 73, 74 just after having left the packet engine 63, 64, or decrypted at the cipher engine 73, 74 just before entering the packet engine 63, 64. Encryption and decryption may be performed via standardized en/decryption protocols as AES, DES or Triple-DES or open protocols like Blowfish, Twofish, MARS, RC6, Rijndael and Serpent. Hash based message authentication is done using standardized protocols using hash functions as MD5, SHA-1, SHA-2, SHA-3 or open source counter parts.

To implement a wire speed encrypted data path, a wire speed cipher engine 73, 74 that does not disturb timing or ordering of incoming packets may provide AES 128/256 bit encryption and decryption for each individual data packet, for example.

In order to perform packet encryption/decryption, keys may be distributed by the CEKM 44 down to the cipher engines 73, 74 via interface 115. Notification on inventory, alarms and failures may be done via interface 116 from the cipher engines to the CEKM 44.

The CEKM 44 may maintain a list of managed cipher engines. The CEKM 44 may schedule updates of master keys at configurable intervals. Master keys may be generated by the CEKM 44.

The generation of keys and/or the distribution of keys by the CEKM 44 may be performed using conventional mechanisms.

Cipher engine activity, alarms and notifications may be collected by the CEKM 44 and may be forwarded to the PFPM 42.

A failure of an optical data connection detected by the WAN facing line interfaces of the cipher engine for the working or protection path may be propagated to the respective node facing interfaces 94, 104. This propagates traffic loss information to the interfaces 83, 87 of the packet engine 63, 64. The packet engine 63, 64 may trigger a traffic switch over, when receiving link loss signals.

A loss of signal may be detected by the Small Form Pluggable (SFP) device implementing the WAN facing line interfaces and may be signaled to the cipher engine 73, 74 via a physical input signal. The matching path 117, 118 towards the packet engine 63, 64 may then be identified, and the corresponding SPF device may be instructed to switch off the transmission signal via a dedicated physical signal.

To monitor health of data flow, an additional stream of packets may be sent. The additional stream of packets may be sent side by side with the data traffic. The following two options can be used:

End-to-end monitoring packets are encrypted like other payload, so they share the same fate. In particular, such monitoring packets that are encrypted may be processed like regular data packets.

On the other hand, ping and trace route messages may indicate problems at intermediate hop, so they are left unencrypted.

The two above-mentioned options can be identified by the cipher engine with a properly configured bit window mechanism, as described above. In case of MPLS, the pseudo wire id can be identified and the "time to live" (TTL) byte can be read. A predefined value or range of this TTL byte may be used to discriminate between the two options of usage, i.e., end-to-end monitoring packets that are to be encrypted/decrypted and ping and trace route messages that are left unencrypted.

In MPLS-TP, an additional stream of OAM/Bidirectional Forwarding Detection (BFD) monitoring packets may be sent at regular interval to do continuity checks. These packets are encrypted like other payload, so they share the same fate. Other OAM packets like ping and trace route messages serve as a detection mechanism for failures of intermediates nodes and are left unencrypted, to allow intermediate points to signal their availability.

OAM messages are identified by the cipher engines 73, 74 with a properly configured bit window mechanism, as described above. The bit window mechanism may look for the label 13 (bottom-of-stack label). Via setting a specific TTL value or range, the modes of "continuity check" respective "debugging mode" can be distinguished and the cipher engines accordingly know whether the OAM packets are to be encrypted or not.

The cipher engines 73, 74 may be non-topology-aware and non-time-aware. The cipher engines 73, 74 do not need to have any knowledge of the paths that are being set up. The cipher engines 73, 74 do not need to have any knowledge of time stamping information and/or of any time stamping protocol. In order to ensure that packet ordering and relative timing is not affected by the cyber security function(s) performed by the cipher engines 73, 74, traffic may be pre-shaped before it leaves the packet engine 63, 64 and enters the cipher engine 73, 74. Thereby, it is possible to assure that packets are undisturbed in position in data flow compared to their position before entering the cipher engine. This ensures that time stamping of packets at the ports 83, 87 are still valid when passing through the cipher engine 73, 74.

When the cipher engine 73, 74 performs encryption, a sequence number is added to each data packet, increasing the length by, e.g., 8 bytes, as will be explained with reference to FIG. 4. When the cipher engine 73, 74 performs authentication, additional 16 bytes for message authentication code are added, as will be explained with reference to FIG. 5. To ensure that there is no change in packet flow, the packet engine 63, 64 keeps the number of bytes in the inter-packet gap large enough. This compensates the increase of packet length needed when bytes are added to the packet by the cipher engine 73, 74. The pre-shaping may be performed by the packet engine 63, 64, thereby eliminating the risk that the order and relative timing of packets is changed by the cipher engine 73, 74 that is non-time-aware and which is placed outside of the time-stamping context of the network.

FIG. 4 and FIG. 5 illustrate operation of the cipher engine 73, 74 when performing encryption and/or authentication operations on a data packet 120 received from the packet engine 63, 64. The packet engine 63, 64 has enlarged the inter-packet gap 129 to a value of, e.g., 36 bytes. The data packet 120 may be an unencrypted MPSL data packet. The data packet 120 may include a preamble and start frame delimiter (SFD) 121. The data packet 120 may include a destination address media access control (MAC) address 122. The data packet 120 may include a source address media access control (MAC) address 123. The data packet 120 may include a MPLS Label Switched Path (MPLS LSP) 124. The data packet 120 may include a MPLS Pseudo-Wire (MPLS PW) 125. The data packet 120 includes unencrypted Pseudo-Wire payload 126. The data packet 120 may include a Frame Check Sequence (FCS) 127.

FIG. 4 illustrates the encrypted data packet 130, which results from the encryption operation of the cipher engine 73, 74 when applied to the data packet 120. An encryption code 131 may be added included in the encrypted data packet 130. The encrypted data packet 130 includes encrypted payload 132, which may be generated from the MPLS PW 125 and the PW payload 126. The encrypted payload 132 may define the encrypted service data.

Encryption causes the encrypted data packet 130 to have a size that exceeds that of its unencrypted counterpart 120. However, the inter-packet gap 129 is enlarged by the packet engine 63, 64 such that the increase in size of the encrypted data packet 130, as compared to the unencrypted data packet 120, does not exceed the enlarged inter-packet gap 129. The cipher engine 63, 64 grows the data packet into, but not beyond the enlarged inter-packet gap 129. A finite inter-packet gap 138 may remain between successive encrypted data packets. For illustration, the inter-packet gap 138 may have 28 bytes, when the encryption code 131 has 8 bytes.

FIG. 5 illustrates the encrypted data packet 135 with authentication, which results from the encryption operation and an authentication operation of the cipher engine 73, 74 when applied to the data packet 120. An authentication code 133 may be included in the encrypted data packet 135. The encrypted payload 132 and authentication code 133 may define the encrypted service data.

Encryption and authentication causes the encrypted data packet 135 with authentication to have a size that exceeds that of its unencrypted counterpart 120. However, the inter-packet gap 129 is enlarged by the packet engine 63, 64 such that the increase in size of the encrypted data packet 135 with authentication, as compared to the unencrypted data packet 120, does not exceed the enlarged inter-packet gap 129. The cipher engine 63, 64 grows the data packet into, but not beyond the enlarged inter-packet gap 129. A finite inter-packet gap 139 may remain between successive encrypted data packets with authentication. For illustration, the inter-packet gap 139 may have 12 bytes, when the authentication code 133 has 16 bytes.

In addition to increasing the inter-packet gap size, the packet engine 63, 64 may generate dummy packets and may insert the dummy packets into a flow of data packets provided to the cipher engine 73, 74. The cipher engine 73, 74 may use the dummy packets for inserting control information thereinto. This obviates the need for the cipher engine 73, 74 generating and inserting new packets into the traffic. Rather, the existing dummy packets generated by the packet engine 63 may be filled by the cipher engine 73, 74 with control information, as will be explained with reference to FIG. 10.

Figure 10:
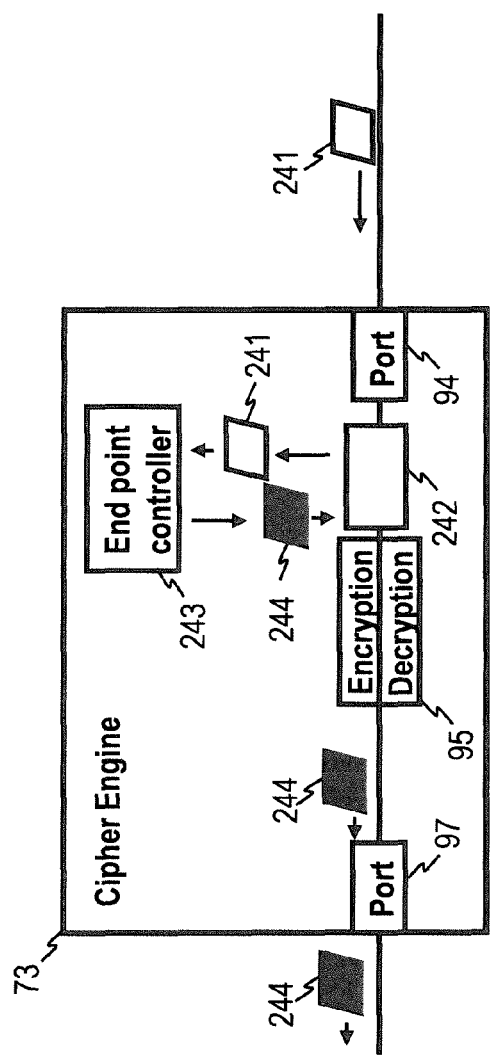
FIG. 10 is a block diagram of a cipher engine according to an embodiment.

FIG. 10 is a block diagram representation of the cipher engine 73. The associated packet engine may generate dummy packets 241 for insertion into a data flow. The dummy packets 241 may be generated such that they do not include payload data, but merely provide packets included in the pre-shaped data traffic received by the cipher engine 73 that can be used by the cipher engine 73 for inserting control data thereinto, e.g. for encryption key exchange. The packet engine 63 inserts the dummy packets 241 into a data flow (i.e., a sequence of data packets including payload data). The dummy packets 241 may be SCC packets.

At least part of the dummy packets 241 in the stream may be filled and used for the management channel transmissions by the cipher engine 73.

The cipher engine 73 may comprise a device 242 to provide the dummy packets 241 to a controller 243 or other integrated semiconductor circuit when the cipher engine 73 needs to generate control packets for management channel transmissions, such as encryption key exchange. The device 242 may select the dummy packets from the incoming pre-shaped data traffic. For this, the cipher engine 73 may scan every packet header and to discriminate dummy packets from regular data traffic including payload data.

Dummy packets 241 that are not required for management channel transmissions may be removed from the pre-shaped data traffic by the cipher engine 73.

The controller 243 may fill at least part of the dummy packets 241 with management channel related control data, in particular relating to encryption and/or authentication. The controller 63 may use at least some of the dummy packets 241 for encryption key exchange, for example. By filling at least part of the dummy packets 241 with security related management channel control data, control packets 244 are generated. The device 242 may re-insert the control packets 244 into the pre-shaped data traffic, at the locations of the dummy packets 241.

Figure 6:
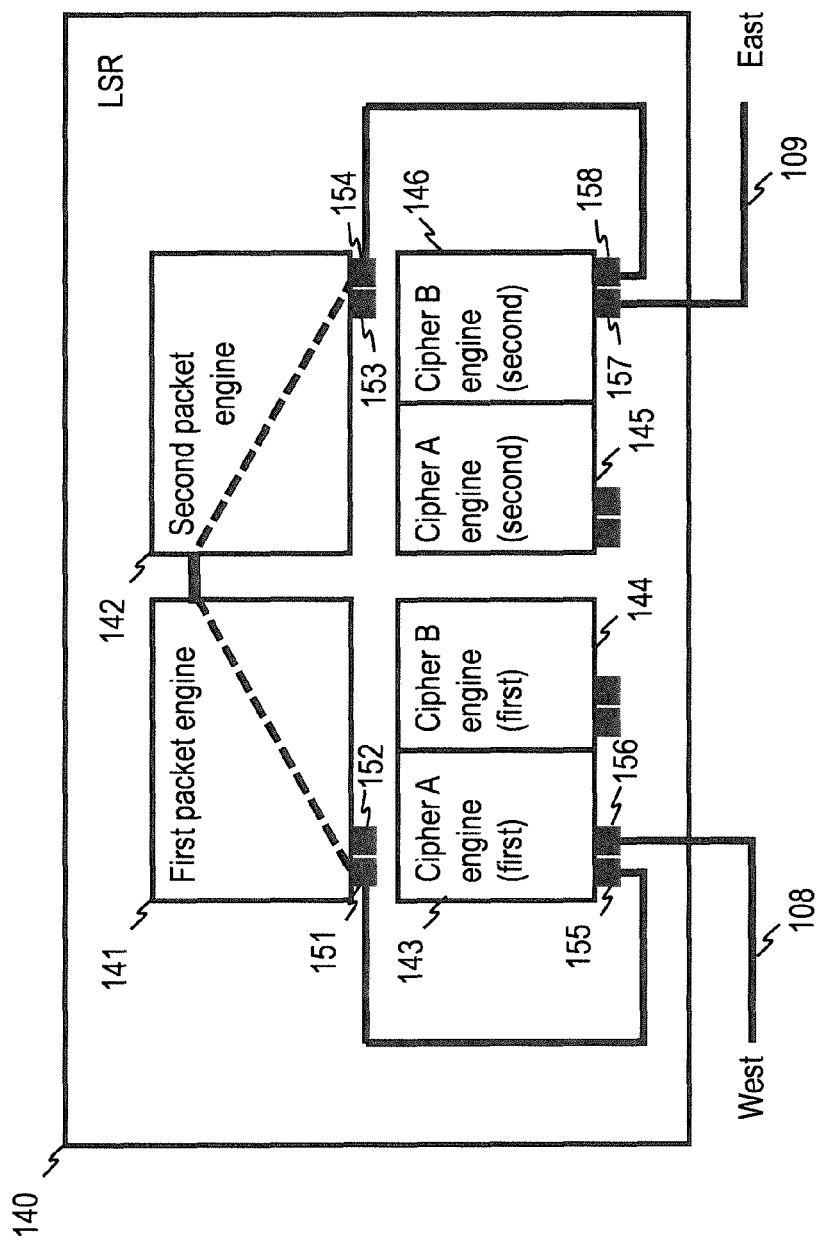
FIG. 6 is a block diagram of a label switch router (LSR) comprising packet engines and cipher engines according to embodiments.

FIG. 6 is a block diagram of a LSR 160, showing transit traffic. Each one of the plurality of LSRs 55, 56, 57, 58 of the network 10 may have a configuration as explained with reference to FIG. 6. A data packet may transit four cipher engine instances in the LSP path for the LSR case.

The LSR 140 may comprise a first packet engine 141 and a second packet engine 142. When the LSR 140 is an intermediate hop of an MPLS path, both the first packet engine 141 and the second packet engine 142 may be used. However, the packet switch (that is generally configured and operative as explained for the packet switches 82, 86 in FIG. 3) may be in stand-by operation and may only serve as port forwarder.

The LSR 140 may comprise a plurality of cipher engines 162, 164, 165, 166.

The first packet engine 141 may have a port A 151 and a port B 152. The second packet engine 142 may have a port A 153 and a port B 154. The cipher engine 143 may have a port A 155 and a port B 156. The cipher engine 146 may have a port A 157 and a port B 158.

Traffic from interface 109 received at port A 157 of the cipher engine 146 may flow through the cipher engine 146 via a port B 158 of the cipher engine 146 to a port B 154 of the second packet engine 142. The second packet engine 142 may have a packet switch that only forwards data packets to the first packet engine 141. The first packet engine 141 may output the data traffic via port A 151 to port A 155 of the first cipher engine 143. The traffic flow may be output via port B 156 of the cipher engine 143 to interface 108.

It will be appreciated that one node can work in a hybrid LER and LSR mode. Accordingly, there is a one-to-one correspondence between the packet engines 141, 142 and cipher engines 143, 144, 145, 146 of a LSR and those of a LER. Thus, the cipher engines 144, 145 may perform encryption/decryption and/or authentication operations for a reverse flow direction than the cipher engines 143, 146, when the node is operated in LER mode, for example.

When the node operates in LSR mode, the cipher engines 143, 146 may use a bit window mechanism to determine whether encrypted data packets are to be decrypted. For an encrypted end-to-end path, the LSR 140 is set up such that the cipher engines 143, 146 do not decrypt encrypted data packets at an intermediate hop of a bidirectional data path. The bit pattern for decryption lookup may contain the top-of-stack label (path identifier) and additional bits (top-of-stack S-bit, bottom of stack label) to distinguish encrypted packets from unencrypted OAM packets, e.g. trace route. OAM packets like ping and trace route messages may serve as a detection mechanism for failures of intermediates nodes and are left unencrypted, as indicated by an appropriately configured bit window.

Figure 7:
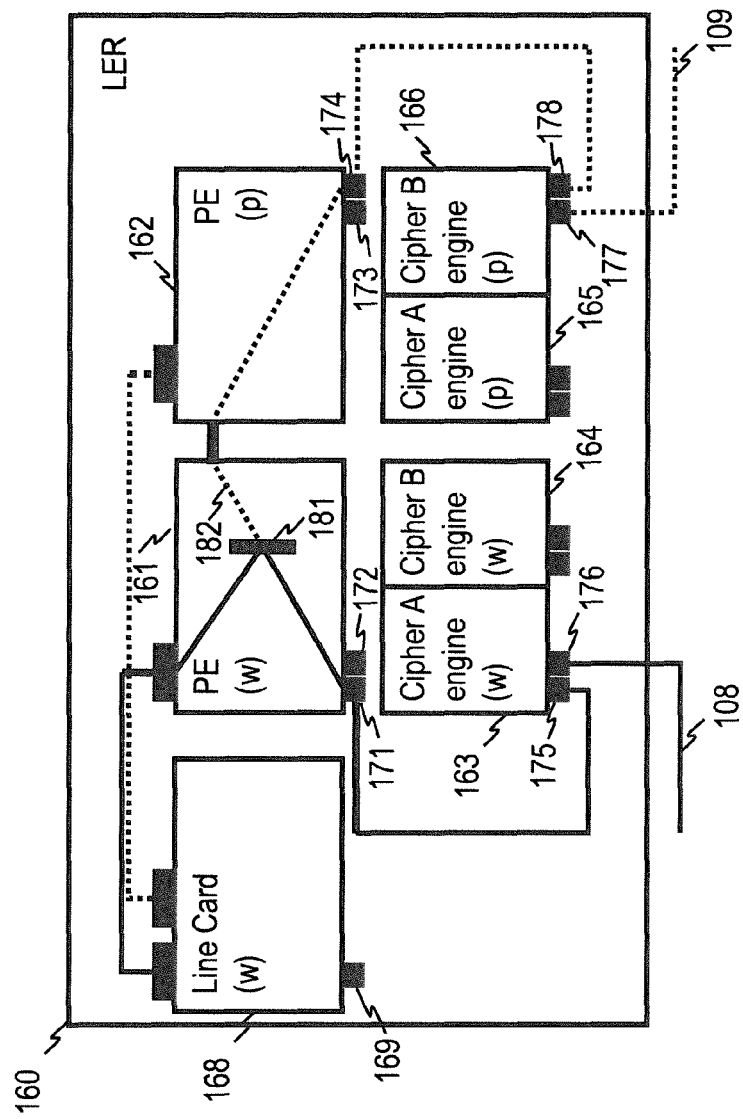
FIG. 7 is a block diagram of a label edge router (LER) comprising packet engines and cipher engines according to embodiments.

FIG. 7 is a block diagram of a LER 160. Each one of the plurality of LERs 53, 54 of the network 10 may have a configuration as explained with reference to FIG. 7. Both MPLS traffic and the encryption session may start at the LER 160.

The LER 160 may comprise first packet engine (PE) 161 for a working (w) path and a second packet engine 162 for a protection (p) path. A tunnel start 181 is provided in the first packet engine 161 for the working path. A protection flow 182, indicated by broken lines in FIG. 7, may start at the first packet engine 161.

The LER 160 may comprise a plurality of cipher engines 163, 164, 165, 166.

The LER 160 may comprise a line card 168. The line card 168 may have ports 169.

The first packet engine 161 may have a port A 171 and a port B 172. The second packet engine 162 may have a port A 173 and a port B 174. The cipher engine 163 may have a port A 175 and a port B 176. The cipher engine 166 may have a port A 177 and a port B 178. The cipher engines 163 and 166 perform encryption and/or authentication for a first direction on a bi-direction tunnel pair. The respective associated cipher engine 164, which may be connected to the same first packet engine 161 as the cipher engine 163, and cipher engine 165, which may be connected to the same second packet engine 162 as the cipher engine 166, may perform decryption and/or authentication for a second direction on the bi-direction tunnel pair, which is opposite to the first direction.

Traffic from the line card 168 may be provided by first packet engine 161 via port A 171 to the port A 175 of the cipher engine 163. The cipher engine 163 may perform encryption and/or authentication. A significant portion of each data packet is replaced by its encrypted counterpart. The encrypted traffic is output via port B 176 of the cipher engine 163 to interface 108.

The protection path may extend through the second packet engine 162. Traffic may be output via port B 174 of the packet engine 162 to port B 178 of the cipher engine 166. The cipher engine 166 may perform encryption and/or authentication. The traffic of the protection path may be output via port B of the cipher engine 166 to interface 109.

The cipher engines 163, 166 may use a bit window mechanism to determine which data packets are to be encrypted. The bit pattern for encryption lookup may contain the top-of-stack label (path identifier) and additional bits (top-of-stack TTL value, bottom of stack label).

The cipher engines 164, 165 may use a bit window mechanism to determine which data packets are to be decrypted. The bit pattern for decryption lookup may contain the top-of-stack label (path identifier) and additional bits (top-of-stack S-bit, bottom of stack label) to distinguish encrypted packets from unencrypted OAM packets, e.g. trace route.

Figure 8:
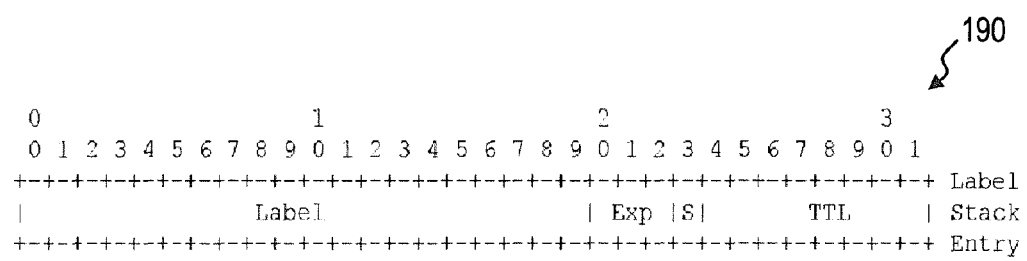
FIG. 8 is a diagram illustrating label stack encoding that may be used for determining whether a data packet or flow of data packets is to be processed.

FIG. 8 illustrates data 190 representative of label stack encoding, e.g., in accordance with RFC 3032. The exemplary data includes a label value, a bottom of stack bit, and time to live (TTL). The cipher engines may be configured using a programmable bit window, to determine whether data packets are to be processed by the respective cipher engine or whether the data packets are to be left untouched. For illustration, the bit pattern for encryption lookup may contain the top-of-stack label (path identifier) and additional bits (top-of-stack TTL value, bottom of stack label). The bit pattern for decryption lookup may contain the top-of-stack label (path identifier) and additional bits (top-of-stack S-bit, bottom of stack label) to distinguish encrypted packets from unencrypted OAM packets, e.g. trace route.

Different options of performing traffic health monitoring can be identified by the cipher engine with the bit window mechanism. For illustration, the pseudo wire id can be identified and the "time to live" (TTL) byte can be read. A predefined value or range of this TTL byte may be used to discriminate between end-to-end monitoring packets that are to be encrypted/decrypted and ping and trace route messages that are left unencrypted, respectively for traffic health monitoring.

Figure 9:
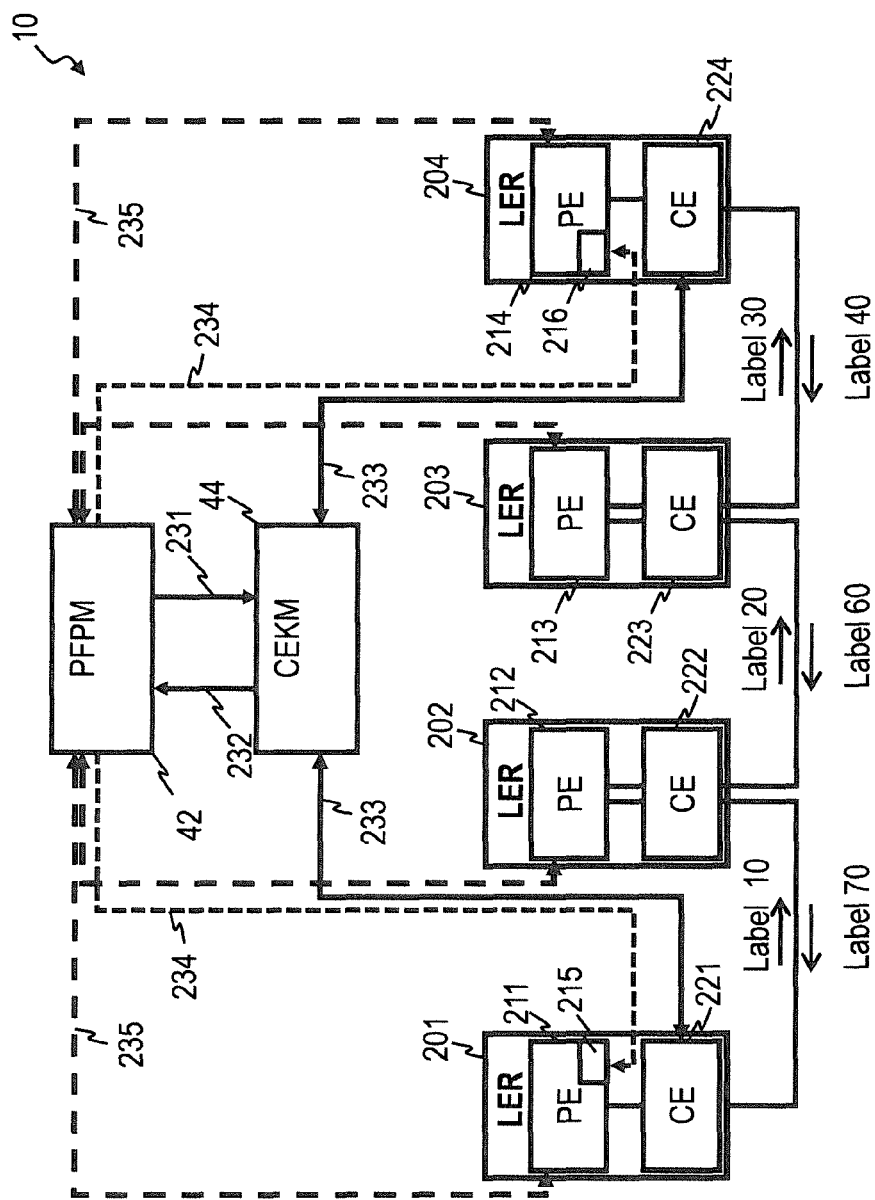
FIG. 9 is a schematic representation of a network comprising packet engines and cipher engines according to an embodiment.

FIG. 9 is a block diagram illustrating a hierarchy of management functions for a network 10. The PFPM 42 controls packet flow. The CEKM 44 controls the encryption paths, i.e., the cipher engines at the endpoint nodes and intermediate nodes of the cyber secure paths, and provides the respective keys. The network 10 may comprise a plurality of LERs 201, 202, 203, 204, each comprising a packet engine 211, 212, 213, 214 and a cipher engine 221, 222, 223, 224. While only one packet engine and one cipher engine are illustrated in FIG. 9, it will be appreciated that each LER may comprise a plurality of packet engines and a plurality of cipher engines, as previously explained. For illustration, each LER 201, 202, 203, 204 may respectively comprise two packet engines for working and protection paths, and four cipher engines that are used for the two directions of both the working and protection paths.

The CEKM 44 may receive hardware-defined identifiers 233 from the cipher engines. The hardware-defined identifiers 233 may be board-identifiers, for example. Each cipher engine may have a hardware-defined identifier that is unique in the network. The hardware-defined identifiers may be provided to the PFPM 42 via interface 232.

The following control steps may be performed:

Step A: The CEKM 44 and the PFPM 42 may exchange, respectively for each path, the following tupel 231, 232:
  i. hardware-defined identifier (i.e., global engine address)
  ii. tunnel-id,
  iii. MPLS label,
  iv. direction,
  v. profile-id.

The profile-id may identify a set of auxiliary information, like traffic types which should left untouched.

Step B: When having verified successful application of cipher engine configuration, the PFPM applies pre-shaping parameter configuration 234 to ensure proper timing and ordering of the packet flow. The pre-shaping parameter configuration 234 may be provided to a dummy packet controller 215, 216 of the packet engine.

Step C: After having received positive confirmation that the pre-shaping parameter configuration has been successfully applied, the PFPM 42 applies path configuration 235 to the packet engines. If the pre-shaping parameter configuration has not been successful, the simulation in PFPM 42 may be rolled back, and the configuration may not be applied.

Taking down a path involves the same acknowledgements. The path is taken down in reverse order from step C to step A.

Figure 11:
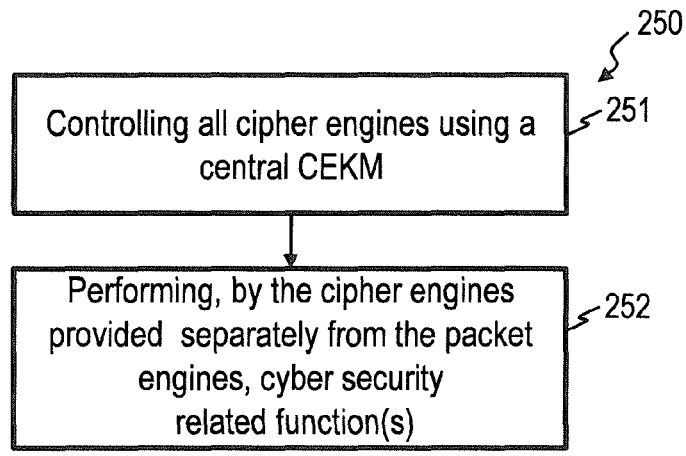
FIG. 11 is a flow chart of a method according to an embodiment.

FIG. 11 is a flow chart of a method 250 according to an embodiment.

At step 251, a plurality of cipher engines that are provided separately from respective packet engines may be controlled using a central CEKM. Controlling the plurality of cipher engines may comprise providing keys for encryption to the cipher engines. Controlling the plurality of cipher engines may comprise configuring, by the CEKM, a programmable bit window in dependence on paths set up by the PFPM.

At step 252, the cipher engines provided separately from the packet engines may perform at least one cyber security related function. The cyber security related function may comprise encryption/decryption. The cyber security related function may comprise authentication.

Figure 12:
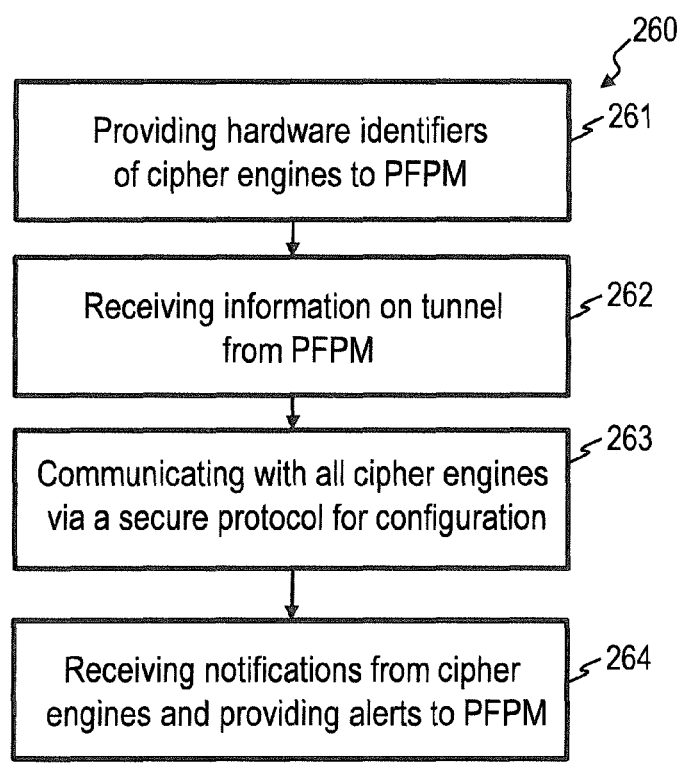
FIG. 12 is a flow chart of a method according to an embodiment.

FIG. 12 is a flow chart of a method 260 according to an embodiment. The method 260 may be performed by a CEKM according to an embodiment.

At step 261, the CEKM may provide hardware identifiers of cipher engines to the PFPM. The CEKM may provide no information on the cyber security system other than this inventory information to the PFPM.

At step 262, the CEKM may receive information on a path, or topology information, from the PFPM. The information on the path may include a tunnel-id, an MPLS label or label stack, and a direction, for example.

At step 263, the CEKM may communicate with all cipher engines via a secure protocol for configuring the cipher engines. Configuring the cipher engines may comprise programming the programmable bit window used by the cipher engines for determining whether or not data packets are to be subjected to cyber security functions.

At step 264, the CEKM may receive notifications from the cipher engines during operation of the network. The CEKM may provide alerts to the PFPM.

The methods, devices, and systems according to embodiments provide a secure communication and wire-like determinism, even when transiting through complex meshed network.

While exemplary embodiments have been explained with reference to the drawings, modifications and alterations may be implemented in other embodiments. The methods, devices, and systems may be used for MPLS networks, without being limited thereto.

The methods, devices, and systems according to embodiments may be used for deterministically transiting encrypted and authenticated data packets across complex and meshed network topologies. For these networks, such as MPLS-TP networks, a coherent association of protected end-to-end tunnels with their respective cyber secure redundant data link endpoints, i.e. cipher engines, is provided. For security reasons, the two subsystems are kept strongly separated, but may nevertheless be synchronized. A dynamic protocol may be used to support a strictly limited information exchange. This keeps the two redundant systems in conformity with each other, during all standard and exceptional states of network operation.

While embodiments will be described in which end-to-end encryption and/or authentication is performed, the techniques disclosed herein may also be used for encryption and/or authentication along segments of an end-to-end path.

The methods, devices, and systems do not need packet addition and allow the same delay to be maintained for all packets during encryption steps. Potential needs of the cipher engine for adding packets to the stream are circumvented by adding dummy packets by a packet engine separate from the cipher engine. Inter-packet gaps can be enlarged in the packet engine when needed, so as to avoid any disturbance eventually coming from cipher engine control packet exchange needs.

Embodiments of the invention enhance protocols like MPLS to be truly cyber secure.

As will be understood by the skilled person, the embodiments disclosed herein are provided for better understanding and are merely exemplary. Various modifications and alterations will occur to the skilled person without deviating from the scope of the invention as defined by the claims.

The invention claimed is:

1. A method of providing secure communication over end-to-end data paths in a timed deterministic packet network, method comprising:
   operating a plurality of packet engines including a first processor structured to perform packet handling;
   centrally controlling, by a cipher engine and key manager (CEKM) including a second processor, a plurality of cipher engines, each cipher engine of the plurality of cipher engines being respectively associated with a respective packet engine of the plurality of packet engines and provided separately from the respective packet engine, at least some of the plurality of cipher engines being respectively provided either between a respective packet engine associated with an endpoint node of the time deterministic packet network and a network facing port of the endpoint node, or between the respective packet engine associated with the endpoint node and first transit node connected to the endpoint node; and
   performing, by the plurality of cipher engines, at least one cyber security function.

2. The method of claim 1, further comprising setting up, by a centralized packet flow path manager (PFPM) endpoint nodes and intermediate transit nodes of the end-to-end data paths of the time deterministic packet network.

3. The method of claim 2, further comprising selecting, by a first cipher engine of the plurality of cipher engines, bits from a data packet using a programmable bit window, wherein the bits selected according to the programmable bit window identify data packets that are to be processed by the cipher engine, wherein information exchanged between the CEKM and the PFPM is used for configuring the bit window.

4. The method of claim 3, wherein the bit window is different at an entry node and an exit node of an end-to-end data path.

5. The method of claim 2, wherein the PFPM is communicatively connected to all endpoint nodes and intermediate transit nodes of the time deterministic packet network.

6. The method of claim 2, wherein the CEKM is executed on a first server and the PFPM is executed on a second server different from the first server.

7. The method of claim 6, further comprising:
   discovering, by the CEKM, hardware defined identifiers of the plurality of cipher engines, and
   providing, by the CEKM, the hardware defined identifiers to the PFPM, wherein the CEKM provides only the hardware defined identifiers and alarms to the PFPM.

8. The method of claim 2, further comprising restricting information provided by the CEKM to the PFPM.

9. The method of claim 2, wherein the CEKM receives information relating to a data flow topology of an end-to-end data path from the PFPM for configuring the plurality of cipher engines.

10. The method of claim 9, wherein the information relating to the data flow topology comprises a tunnel-identifier, an MPLS label, and a direction.

11. The method of claim 2, wherein the CEKM and the PFPM communicate via a secure channel.

12. The method of claim 1, wherein the CEKM is communicatively connected to each one of the plurality of cipher engines and communicates with each one of the plurality of cipher engines via a secure protocol for configuring the plurality cipher engines or for notification.

13. The method of claim 1, further comprising pre-shaping, by a packet engine, data packets entering a first cipher engine of the plurality of cipher engines to assure that positions of the data packets in a traffic flow remain unchanged upon passage through the first cipher engine, wherein the data packets are pre-shaped such that time stamping information of the data packets entering the first cipher engine is still valid when the data packets leave the first cipher engine.

14. The method of claim 13, wherein the pre-shaping comprises enlarging, by the packet engine, an inter-packet gap before a flow of data packets enters the cipher engine.

15. The method of claim 1, wherein the plurality of packet engines and the plurality of cipher engines use a common global information identity to assure a global identification of data packets belonging to the same traffic flow.

16. The method of claim 15, wherein the common global information identity indicates a Multiprotocol Label Switching (MPLS) tunnel.

17. The method of claim 1, wherein data packets are encrypted by a first cipher engine of the plurality of cipher engines immediately after leaving an associated packet engine, or wherein data packets decrypted by the first cipher engine immediately before entering the associated packet engine.

18. The method of claim 1, wherein the plurality of cipher engines performs message authentication.

19. The method of claim 1, further comprising propagating, by a first cipher engine of the plurality of cipher engines, traffic loss information to an interface of the associated packet engine to trigger a traffic switch-over, wherein propagating the traffic loss information is triggered by a failure of an optical data connection detected by a wide area network (WAN) facing line interface.

20. The method of claim 1, further comprising monitoring a health of a data flow, comprising sending an additional stream of data packets, wherein the additional stream of data packets comprises end-to-end monitoring packets that are encrypted by the plurality of cipher engines; and/or ping and trace route message that are left unencrypted.

21. The method of claim 1, wherein the packet engines perform time stamping, and the plurality of cipher engines are non-time-aware and non-topology-aware.

22. The method of claim 1, wherein the time deterministic packet network is a packet network for automation of high voltage lines.

23. A cipher engine and key manager (CEKM) for securing communication over end-to-end data paths in a timed deterministic packet network having packet engines that perform packet handling, the time deterministic packet network including a packet flow path manager (PFPM) that configures traffic flow nodes of the time deterministic packet network, the CEKM comprising:
 a first interface operative to receive information on a data flow topology of an end-to-end data path from the PFPM;
 a second interface operative to provide configuration information to a plurality of cipher engines that are each associated with and provided separately from a respective packet engine, the plurality of cipher engines being configured to perform at least one cyber security function; and
 at least one processor operative to generate the configuration information based on the data flow topology.

24. The cipher engine and key manager of claim 23, the CEKM being operative to exchange information with the PFPM over the first interface to set up bit windows that identify data packets that are to be processed by the plurality of cipher engines.

25. The cipher engine and key manager of claim 23, wherein the CEKM is operative to discover hardware defined identifiers of the plurality of cipher engines and to provide only the hardware defined identifiers and alarms to the PFPM.

26. A cipher engine, comprising:
 a first interface operative to be directly connectable to a packet engine that performs packet handling for a timed deterministic packet network;
 a second interface operative to be connectable to a network facing port of an endpoint node or a first transit node connected to the endpoint node; and
 a third interface operative to receive configuration information from a cipher engine and key manager (CEKM),
 wherein the cipher engine is operative to perform a cyber security function on data packets of a traffic flow through the cipher engine based on the configuration information received from the CEKM, and
 wherein the cipher engine is operative to select bits from a data packet using a programmable bit window, wherein the bits selected according to the programmable bit window identify data packets that are to be processed by the cipher engine.

27. The cipher engine of claim 26, wherein the cipher engine is operative to perform the cyber security function without having information on a topology of an end-to-end path for which the cyber security function is performed and without using time stamping information of the data packets.

28. A timed deterministic packet network, comprising:
 a plurality of packet engines structured to perform packet handling;
 a packet flow path manager (PFPM) structured to provide configuration information to traffic flow nodes of the time deterministic packet network;
 a plurality of cipher engines, each cipher engine being structured to receive data packets of a traffic flow from an associated packet engine of the plurality of packet engines or to provide data packets of the traffic flow to the associated packet engine of the plurality of packet engines, each cipher engine including:
  a first interface operative to be directly connectable to a packet engine that performs packet handling for a timed deterministic packet network,
  a second interface operative to be connectable to a network facing port of an endpoint node or a first transit node connected to the endpoint node, and
  a third interface operative to receive configuration information from a cipher engine and key manager (CEKM),
 wherein the CEKM is coupled to the PFPM and the plurality of cipher engines, and includes:
  a fourth interface operative to receive information on a data flow topology of an end-to-end data path from the PFPM;
  a fifth interface operative to provide configuration information to the plurality of cipher engines that are each associated with and provided separately from a respective packet engine, and
  at least one processor operative to generate the configuration information based on the data flow topology, and
 wherein the cipher engine is operative to perform a cyber security function on data packets of a traffic flow through the cipher engine based on the configuration information received from the CEKM.

\* \* \* \* \*